United States Patent
Singh

(10) Patent No.: US 11,871,081 B2
(45) Date of Patent: Jan. 9, 2024

(54) LEVERAGING EMOTIONAL TRANSITIONS IN MEDIA TO MODULATE EMOTIONAL IMPACT OF SECONDARY CONTENT

(71) Applicant: Rovi Guides, Inc., San Jose, CA (US)

(72) Inventor: Mona Singh, Cary, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/750,664

(22) Filed: May 23, 2022

(65) Prior Publication Data
US 2023/0379543 A1 Nov. 23, 2023

(51) Int. Cl.
*H04N 21/466* (2011.01)
*H04N 21/234* (2011.01)
*H04N 21/442* (2011.01)
*H04N 21/4223* (2011.01)

(52) U.S. Cl.
CPC ... *H04N 21/4667* (2013.01); *H04N 21/23424* (2013.01); *H04N 21/4223* (2013.01); *H04N 21/44218* (2013.01)

(58) Field of Classification Search
CPC ......... H04N 21/4667; H04N 21/44016; H04N 21/44218; H04N 21/812; H04N 21/42201
USPC ............................................................ 725/12
See application file for complete search history.

(56) References Cited

U.S. PATENT DOCUMENTS

| | | | |
|---|---|---|---|
| 9,105,047 B1 * | 8/2015 | Curran ............... | G06Q 30/0255 |
| 9,525,912 B1 * | 12/2016 | Israelian ............... | H04N 21/84 |
| 9,942,615 B1 * | 4/2018 | Panchaksharaiah .... | G06F 16/48 |
| 2003/0093784 A1 * | 5/2003 | Dimitrova ........ | H04N 21/42201 725/35 |
| 2005/0289582 A1 * | 12/2005 | Tavares ............ | H04N 21/25891 725/10 |
| 2009/0150919 A1 * | 6/2009 | Lee ...................... | H04N 21/235 725/10 |
| 2013/0283162 A1 * | 10/2013 | Aronsson ............. | G11B 27/105 715/719 |
| 2013/0288212 A1 * | 10/2013 | Bist ....................... | G06Q 50/01 434/236 |

(Continued)

OTHER PUBLICATIONS

Kollias, Dimitrios, et al., "Analysing Affective Behavior in the second ABAW2 Competition", arXiv:2106.15318v2 [cs.CV] Jul. 3, 2021.

(Continued)

*Primary Examiner* — Cynthia M Fogg
(74) *Attorney, Agent, or Firm* — HALEY GUILIANO LLP

(57) ABSTRACT

Systems and methods for determining emotional responses to videos, generating emotional arc based on the responses and reactions, and determining the type and/or point of insertion of secondary content based on the determined emotional responses are disclosed. The methods display primary content to a plurality of users and determine their emotional response as they consume the primary content. An average emotional arc is generated based on the determined emotional response and it is compared to a current emotional arc generated based on emotional response from a current user. When values of the current emotional are within a predefined range of the average emotional arc at a particular play position in the timeline of the primary content, a secondary content that is designated for the value of the current emotional arc is inserted in the primary content at the particular play position.

22 Claims, 12 Drawing Sheets

(56) References Cited

U.S. PATENT DOCUMENTS

| | | | |
|---|---|---|---|
| 2017/0068847 A1* | 3/2017 | el Kaliouby | G06V 40/176 |
| 2017/0134803 A1* | 5/2017 | Shaw | H04N 21/234363 |
| 2018/0260026 A1* | 9/2018 | Drake | A61M 21/00 |
| 2020/0336800 A1* | 10/2020 | Novick | H04N 21/42201 |
| 2021/0117685 A1* | 4/2021 | Sureshkumar | H04N 21/812 |
| 2021/0168450 A1* | 6/2021 | Gritzman | H04N 21/25891 |
| 2022/0148452 A1* | 5/2022 | Dellimore | H04L 67/535 |

OTHER PUBLICATIONS

U.S. Appl. No. 17/750,666, filed May 23, 2022, Mona Singh.

\* cited by examiner

| Option | Primary Content | Monitor User in Real Time | Action |
|---|---|---|---|
| A | X | X | Insert secondary content at a play position where user's real-time response is within a desired threshold |
| B |   | X | Determine real-time response to 1st part of the secondary content and adjust the 2nd part that is to be inserted at a predetermined play position based on the real-time response determined |
| C | X | X | Insert 1st part of a secondary content at a predetermined play position where user's real-time response is within a desired threshold; Determine real-time response to 1st part of the secondary content and adjust the 2nd part based on the real-time response determined; and Insert 2nd part of secondary content at a play position where user's real-time response is within a desired threshold |
| D | X | X | Obtain emotional data for the primary content from two separate groups, where the first group has as opposing views to the second group; Determine real-time user response to gauge whether the user is aligned with the first or the second group; Play secondary content that is associated with the views of the group to which the user is aligned. |

FIG. 4

| Play Position | Valence | Activation | Other Factors | Emotional Arc |
|---|---|---|---|---|
| 1 | 10 | 5 | 0 | 15 |
| 5 | 8 | 11 | 0 | 19 |
| 10 | 3 | 12 | 0 | 15 |
| 15 | 12 | 9 | 0 | 21 |
| 20 | 21 | 7 | 3 | 31 |
| 25 | 19 | 9 | 0 | 28 | ered or searched by the user. For example, if a user has searched for camping equipment, such search data may be captured and used by publishers or advertisers to provide camping-related advertisements during content being consumed by the user. As such, advertisements related to camping may show up in the middle of a movie or show being consumed or during a timeout of a live-streamed game. Likewise, if a user has searched for wedding gowns, advertisers may provide supplemental content related to wedding gowns or other wedding-related accessories to be displayed to the user while they are consuming on-demand or live broadcast media assets.
LEVERAGING EMOTIONAL TRANSITIONS IN MEDIA TO MODULATE EMOTIONAL IMPACT OF SECONDARY CONTENT

FIELD OF INVENTION

Embodiments of the present disclosure relate to generating emotional graphs and arcs based on emotional responses to consumption of primary content and determining which type of secondary content and its point of insertion in the primary content produces a desired emotional impact.

BACKGROUND

In the current climate where technological advances place access to enormous amount of content at users' fingertips, individuals' attention spans are getting shorter and shorter. People have several windows, tabs, and applications open on their mobiles and laptops and jump from one application to another within seconds. When streaming media, such as on streaming media platforms like Netflix™, Hulu™, HBO™ or Disney™, data has shown that individuals jump from one episode to another constantly looking for content that grabs their attention. Even when a series of episodes exists, such as "Game of Thrones," individuals skip from episode to episode and even fast-forward through a lot of content within an episode looking for something that interests them.

In such a world, where attention-grabbing is challenging, content providers, publishers, advertisers, etc. are constantly faced with a dilemma of how to grab a user's attention for particular content, which in the case of advertisements, may be inserted during playback of other (primary) content. Often several attempts are made at capturing the user's attention such that the advertisement generates the desired impact. These efforts may include referral marketing, click-through marketing, and marketing based on content previously selected or searched by the user. For example, if a user has searched for camping equipment, such search data may be captured and used by publishers or advertisers to provide camping-related advertisements during content being consumed by the user. As such, advertisements related to camping may show up in the middle of a movie or show being consumed or during a timeout of a live-streamed game. Likewise, if a user has searched for wedding gowns, advertisers may provide supplemental content related to wedding gowns or other wedding-related accessories to be displayed to the user while they are consuming on-demand or live broadcast media assets.

Providing supplemental content based on the user's search history is useful, but generally does not adequately consider the user's emotional state when the content is provided or consumed (e.g., consumed, listened to, and/or read). For example, if a user is watching a sad scene in a primary content, perhaps of a very emotional scene where somebody is dying, or some other moment that sets a sad or somber mood, displaying supplemental content for a wedding gown would likely not be appealing (or as appealing) to that user at that time.

Current content-insertion methodologies often do not consider how inserted or supplemental content emotionally relates to the primary content being consumed. Current methodologies also do not track the user's emotional response and changes in the user's emotional state as they consume different scenes or segments of the media asset. As such, secondary or supplemental content that has nothing to do with the primary content being consumed and/or nothing to do with the user's emotional state are displayed to the user at random times during the consumption of the media asset. Such consumption of content may have low impact and commonly results in the user focusing away from the content or switching to a different channel, for instance.

As such, there is a need for a method and system to take into account the content being consumed, the type of secondary content, and the stages of the user's emotional responses such that secondary content that fits with the user's emotional state is displayed at the right time to create a higher level of impact.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 4 is a table of options for analyzing emotional responses relating to the primary content and secondary content for determining impact of secondary content, in accordance with some embodiments of the disclosure;

DETAILED DESCRIPTION

Figure 1:
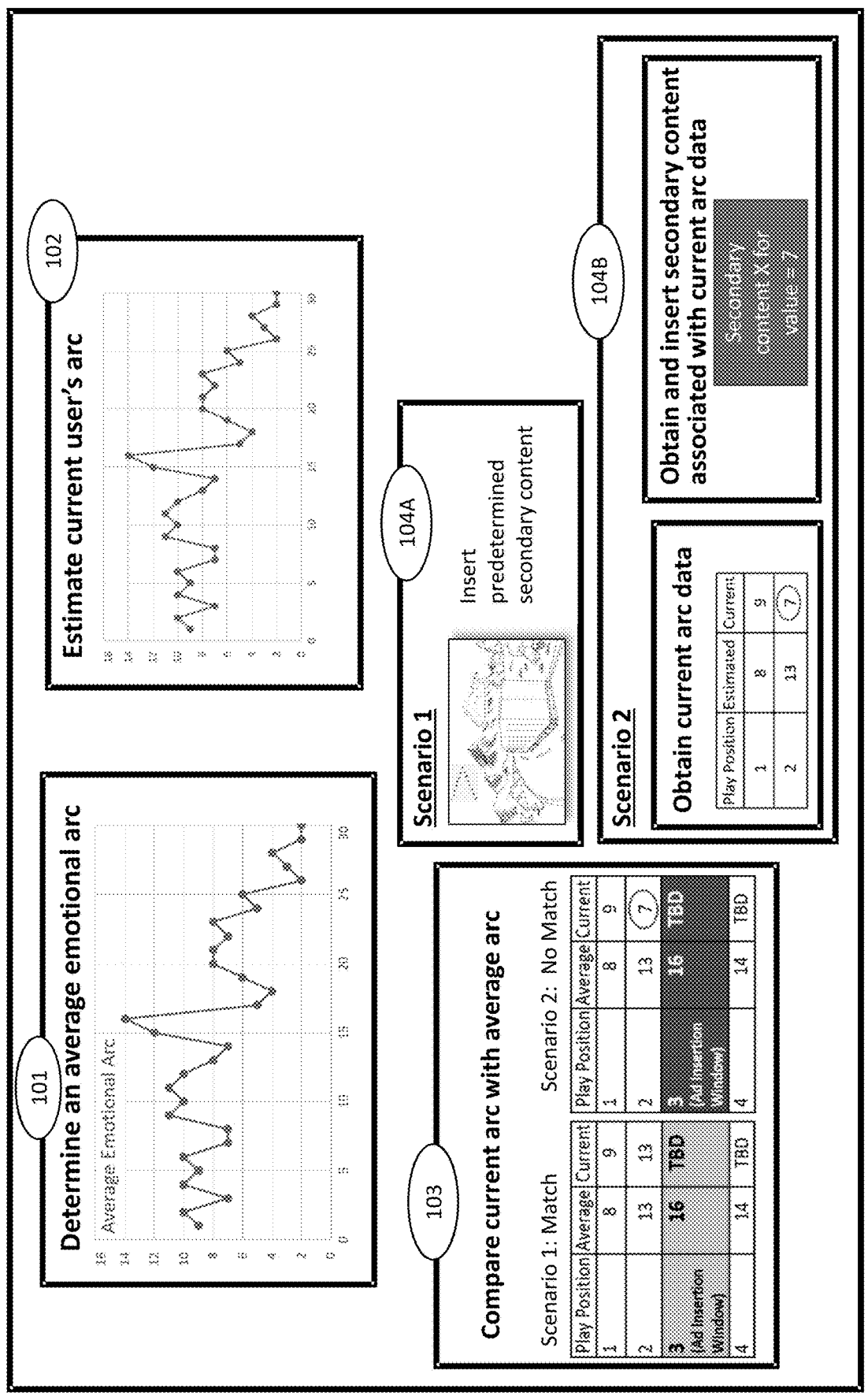
FIG. 1 is a block diagram of an example process for comparing an estimated emotional arc with an actual emotional arc to determine a type of secondary content to insert in primary content for its highest impact, in accordance with some embodiments of the disclosure.

In accordance with some embodiments disclosed herein, techniques are provided that help to overcome some of the above-mentioned limitations by comparing an average emotional arc with a current emotional arc. The average emotional arc is generated based on emotional responses from a plurality of users that have previously consumed primary content, and the current emotional arc is based on real-time emotional responses by a current user consuming the primary content. The disclosed techniques determine, based on the comparison, either the type of secondary content to insert, a play position in the primary content to insert the secondary content, or both.

As referred to herein, the terms "content" and "media content" may be understood to mean electronically consumable user assets, such as television programming, as well as pay-per-view programs, on-demand programs (as in video-on-demand (VOD) systems), advertisements (including infomercials, commercials, and other consumable assets associated with marketing a product or a service), Internet content (e.g., streaming content, downloadable content, Webcasts, etc.), video clips, audio, content information, pictures, GIFs, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. The present disclosure further contemplates that embodiments discussed below with respect to particular primary and/or secondary content, e.g., video content, are also applicable to other forms of primary/secondary content, e.g., audio, images, text, multimedia, and the like.

In one embodiment, primary content, e.g., primary video, is displayed to a plurality of users and their emotional response data on a per scene, frame, or segment over the duration of the primary content is obtained. The emotional response data is then used to generate an emotional arc for each user, which is then used to generate an average emotional arc for the plurality of users. The emotional response data are collected through a variety of components, such as cameras, heartbeat detection components, sensors, lidar, gyroscopes, and accelerometers. These components monitor the user's gaze and other biometrics data as the user consumes the primary content asset and determine the user's emotional responses. For example, cameras located in devices may track the user's eyeball movement to determine if the user's gaze is directed towards the primary content. The cameras may also be used to track specifically which portions, frames, and segments of the primary content were gazed. Likewise, sensors in smart watches, mobile phones, and other wearables may determine the user's heartbeat to determine the user's emotional state, e.g., fast heartbeat may be indicative of excitement and so on. These emotional states experienced during the consumption of the primary content are represented using Russell's circumplex model of emotions as two numbers: one number for activation and one number for valence.

The average emotional arc for the primary content is used to generate an estimate for a current user, i.e., a prediction that the current user watching the same primary content is likely to have same or similar emotional reactions to the various scenes and segments of the primary content as did the other users who previously consumed the primary content. In other words, the average emotional arc is assigned as the estimated emotional arc for a particular user and adjustments and offsets to the estimate are made based on actual emotions that are subsequently determined. The adjustments and offsets, as described below, are made to the valence and activation values. For example, the estimated emotional arc is comprised of activation and valence values. If an actual activation and valence value at a certain play position in the primary content differs from the estimated activation and valence value for that play position, then the activation and valence values are adjusted by applying an offset that is equivalent to the variation determined.

The average emotional arc is used as an estimating tool and compared to the actual emotional response of the user that has consumed the primary content. The actual emotional response may be in the form of a current user's emotional arc. The comparison is performed to determine if the actual response from the user is as estimated. If it is not, then the average emotional arc is adjusted by applying an offset based on the amount of variance of the actual emotional response from the average emotional arc.

In some embodiments, supplemental content, e.g., secondary content, is intended to be inserted at a particular average emotional arc value. Since the average emotional arc is generated based on activation and valence values, the secondary content may be designed to be inserted when the activation and valence values in the average emotional arc reach the desired value. If the system determines that the values in the average emotional arc have reached the desired value to insert the secondary content, a secondary check may be performed. This secondary check includes comparing the user's emotional arc with the average emotional arc to ensure that the actual emotional values are within a range of the estimated emotional value, i.e., within the range of the desired value for inserting the secondary content. If the actual values are within the estimated and desired range then secondary content designated for the range is inserted into the primary content and displayed to the current user.

In one embodiment, where the user's emotional arc is not within the range of the emotional values of the average emotional arc, then the values of the user's current emotional arc at the current play position in the primary content are used to find secondary content, or a version of the secondary content, that is designated for the emotional values that are within a range of the user's current emotional arc values. To the extent such secondary content is not available, then secondary content that is closest to the value of the user's current emotional arc at the current play position is inserted into the primary content.

Several combinations of determining emotional responses, generating emotional arc corresponding to the emotional responses, comparing the emotional arcs, and monitoring in real-time the consumption by the current user are disclosed in the embodiments described herein. These include using a first plurality of users to get an emotional response for the primary content and a different second plurality of users to get an emotional response for the secondary content. The embodiments also include monitoring the emotional arc of the primary content and inserting secondary content at any play position in the primary content when the desired value for the emotional arc in the primary content is achieved. In other words, achieving the desired value for the emotional arc is associated with the user's emotions reaching a state that is desired or optimal for inserting the secondary content. For example, a desired value may be associated with the feeling of excitement. If particular secondary content is better received and reinforced when a user is excited, then the content provider would look for the desired value for the emotional arc in the primary content to reach a value associated with excitement such that the secondary content can be inserted at that point in time.

In one embodiment, flexibility as to where secondary content can be inserted is provided while in other embodiments the insertion of the secondary content is restricted to specific play position or a commercial break in the primary content whenever such breaks are taken, such as in a live game etc.

In another embodiment, a determination is made as to which type of secondary content is to be inserted based on the emotional response values. These and additional embodiments, processes, and systems and components to determine which secondary content to insert and at what play position are described below.

FIG. 1 is a block diagram of an example process for comparing an average emotional arc with an actual emotional arc of the user to determine a type of secondary content to insert in primary content for its highest impact, in accordance with some embodiments of the disclosure.

In some embodiments, as depicted blocks 103-104B of FIG. 1, the points of insertion for secondary content may be predetermined at specific play positions in the primary content. For example, in a movie or a talk show broadcast, commercial or advertisement breaks may be predetermined at certain intervals, such as after every five or 10 minutes in the program. In another example, such as in a news broadcast, or a football or a basketball game, the points of insertion for secondary content may be based on an occurrence of an event, such as whenever the newscast ends a particular segment, such as the weather segment, or in the sports setting whenever a team calls for a time out. The secondary content may need to be inserted in these predetermined positions, and there may be little or no flexibility in where to insert them. In such scenarios, as will be further described in relation to FIG. 2 below, the system may determine the most optimal type of secondary content to insert in the predetermined position such that the type of secondary content selected produces the highest possible impact for the inserted secondary content.

In other embodiments, the points of insertion for secondary content into primary content may be flexible. In such embodiments, the emotional arc of the primary content may be monitored and when the value of the emotional arc reaches a desired value, the secondary content may be inserted.

In some embodiments, the different types or secondary content that can be inserted may include similar messaging but may be presented in different tones and emotions to enhance their impact. For example, a more energetic tone may be used for the secondary content for the same product than a subtle tone if the control circuitry determines that the energetic version of the secondary content may resonate more with a viewer and evoke a desired emotion that will result in having the highest impact for the secondary content. The control circuitry may make such determinations based on analyzing various factors. In other embodiments, the different types of secondary content may include different messaging and may be presented in different tones and emotions to enhance their impact.

In one embodiment, the process of FIG. 1 may begin by determining an average emotional arc of the primary content at block 101. Average emotional arc, which is also referred to herein as estimated emotional arc or default emotional arc, is a tool that can be used to estimate the current user's likely emotional arc, i.e., how likely it is that the current user will act in the same or similar manner as the average number of users did in response to watching the primary content. In one embodiment, the primary content may be an on-demand media asset, and in another embodiment, the primary content may be a live broadcast.

Figure 2:
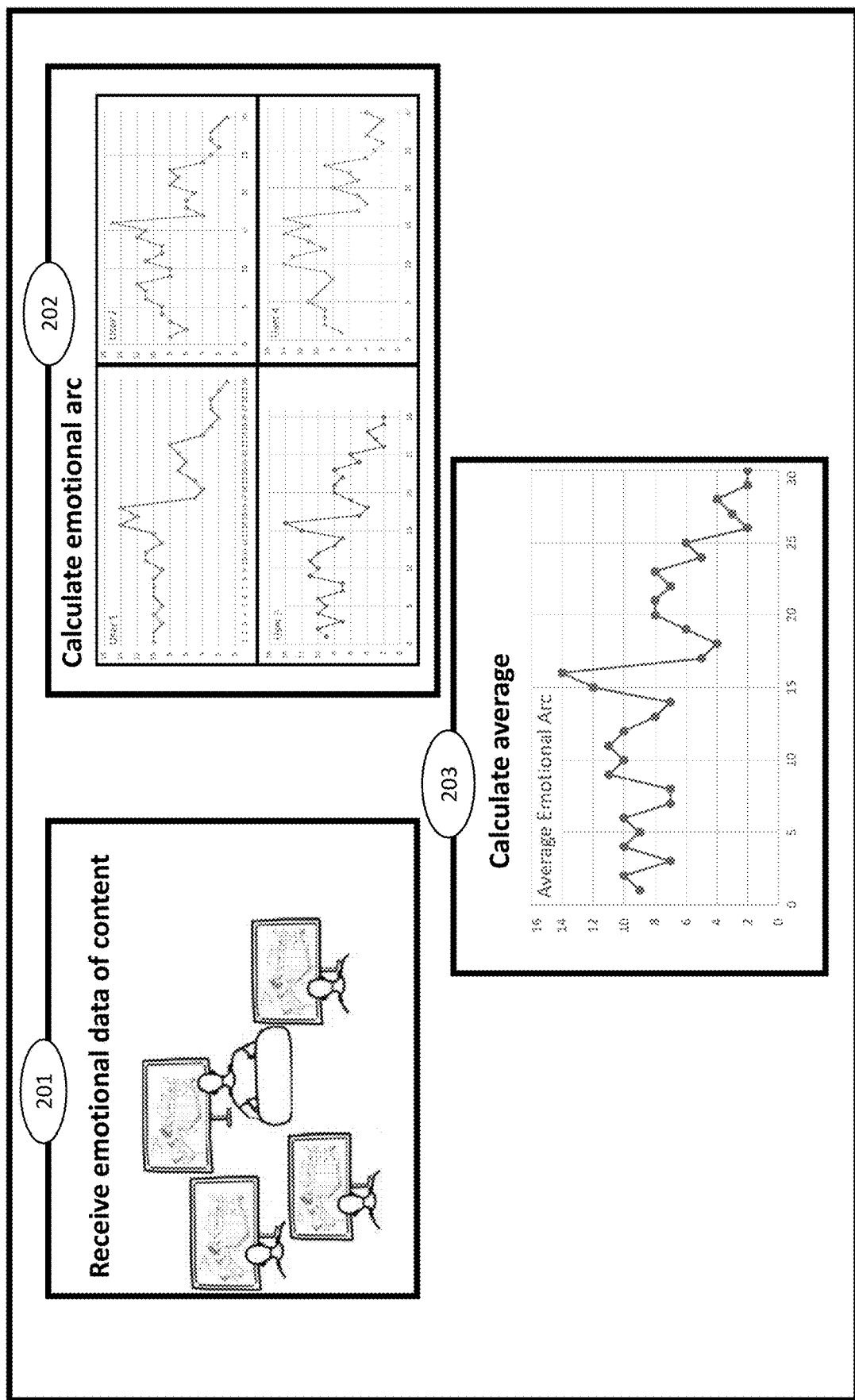
FIG. 2 is a block diagram of an example process for generating an average emotional arc, in accordance with some embodiments of the disclosure.

In some embodiments the emotional arc of the content may be determined as described in FIG. 2. As depicted at block 201, emotional data from a first plurality of users is obtained. The emotional data relates to each user's emotional response to a display of primary content. The emotional data is then used to generate an emotional arc that aggregates the changing emotional states of the viewers/users of the primary content from scene to scene or segment to segment from the start to the end of the primary content.

The process of gathering the emotional responses includes sending a video stream that includes a primary content asset to the first plurality users. As the first plurality of users watch the display of the primary content on a display device, emotional response data, e.g., biometric data from the display device is collected. Such biometric data is indicative of the users' emotions in response to consuming the displayed primary content. The biometric data, including any gaze data, can be determining continuously thorough the playing of the primary content, or can be determined at fixed intervals, such as at every 15 seconds, or at the end of each segment. Although biometric data is described above as data used to derive emotional response, the embodiments are not so limited and they may include other data, such as brain activity, facial expressions, and survey data, to derive emotional response.

Figures 9A, 9B, 9C, 9D:
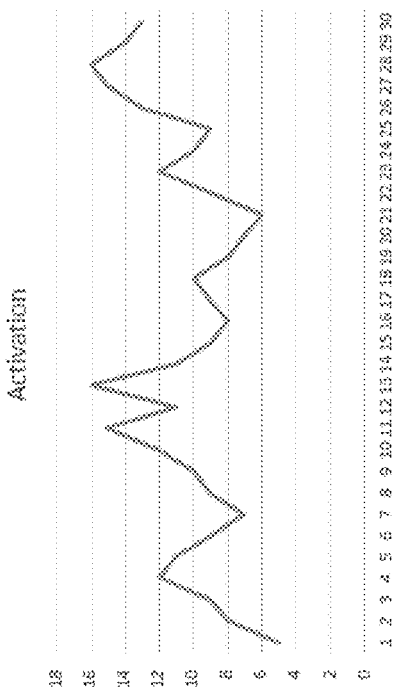
FIG. 9A is an example of an activation graph, in accordance with some embodiments of the disclosure.
FIG. 9B is an example of a valence graph, in accordance with some embodiments of the disclosure.
FIG. 9C is an example of an emotional arc, in accordance with some embodiments of the disclosure.
FIG. 9D is an example of a table that represents values of the emotional arc, in accordance with some embodiments of the disclosure.

The emotions and the various emotional states experienced during the consuming of the primary content may be represented using Russell's circumplex model of emotions as two numbers: one number for activation and one number for valence, for example, as depicted in FIGS. 9A-9D. The activation (or intensity) value indicates how energized the user is while watching the displayed content, such as a segment of the primary content. As referred to herein viewer and user are used interchangeably and mean the same. The valence value indicates how positive or negative the feelings are, such as the degree of positive or negative emotion or feeling. Each dimension or value of activation and valence can be given a fixed scale, e.g., −1 to +1 or some other predetermined scale. Alternatively, each dimension or value of activation and valence can be given a scale of 0-30, as depicted in FIG. 9D, or any other desired value.

The activation and valence value may change throughout the consumption of the primary content and even within each segment of the content. For example, an exciting car chase may lead to high activation and either positive or negative valence depending on whether the protagonist is about to make a deadline or is being chased by a serial killer. Similarly, at the end of a thriller, when the protagonists are explaining how they won, the activation could go down whereas the valence could become quite positive.

The biometric data and gaze data may be collected frame by frame or a segment by segment on a periodic basis, or at certain key points in the primary media asset. Other alternatives to biometric data, such as brain activity, facial expressions, and survey data, may also be used to derive emotional data. The biometric data, such as heart rate, gaze and galvanic skin response may be collected via the display device's camera, heart rate monitor, sensors, and other components.

In one embodiment, as the primary content transitions from plot to plot, frame to frame, segment to segment, or one time interval to another time interval, the biometric data is captured for each such plot, frame, segment or interval and stored, for instance, in a storage of the display device. In another embodiment, such biometric data may be sent to a server for processing.

The biometric data differs from user to user as their emotional responses to a scene, frame, or segment of the primary content may differ. For example, one user may find a scene in the primary content to be a sad scene while another user may not find that scene to be sad. Likewise, one user may find a scene to be exciting, funny or exhilarating, while the other may find the scene to be an average scene or not exciting.

The degree of the biometric data also differs from user to user. For example, even when one user may have a similar emotional response to another user, the degree of the response may vary. For example, in response to a sad emotional scene in the primary content, one user may feel sad to the degree of crying while the other user may also feel sad, but not as much. Or a user may have seen the same scene multiple times, or many similar scenes, thereby making the scene more repetitive or mundane and not invoking the same emotional response as in another user who may be consuming the scene for a first time. In this regard, the system may determine whether the user has consumed the primary content, or a specific scene in the primary content, for the first time or is consuming it for the second or a subsequent time. The system may track and store such data relating to the number of times the same content has been consumed. The system may provide an offset in an emotional response if the primary content or scene has been consumed more than once. The offset may be larger for each time the same content is consumed to offset the mundane or muted affect it may cause on the user due to repetitive consumption. Whatever the reasons for the different types and degrees of emotional response, the biometric data specific to each user may be captured and used for processing.

At block 202, the biometric data from each user, from a first plurality of users that have previously consumed the primary content, may be used to generate a graph, also referred to as an emotional arc, for each user. In one embodiment, biometric data collected for the four users depicted in block 201 may be used to generate a customized emotional arc for each of the four users in block 202. The emotional arc is depicted over a period of time and each data point in the emotional arc relates to a play position in the primary content.

The emotions of the user, also referred to as the user's emotional state, in one embodiment, is represented using Russell's circumplex model of emotions as two numbers; one number for activation (also called intensity) and one number for valence. The emotional arc represents these emotional states experienced by the user during the display of the primary content or a segment of primary content, such as emotions experienced while different scenes and emotional transitions in the primary content are displayed to the user.

Figure 7:
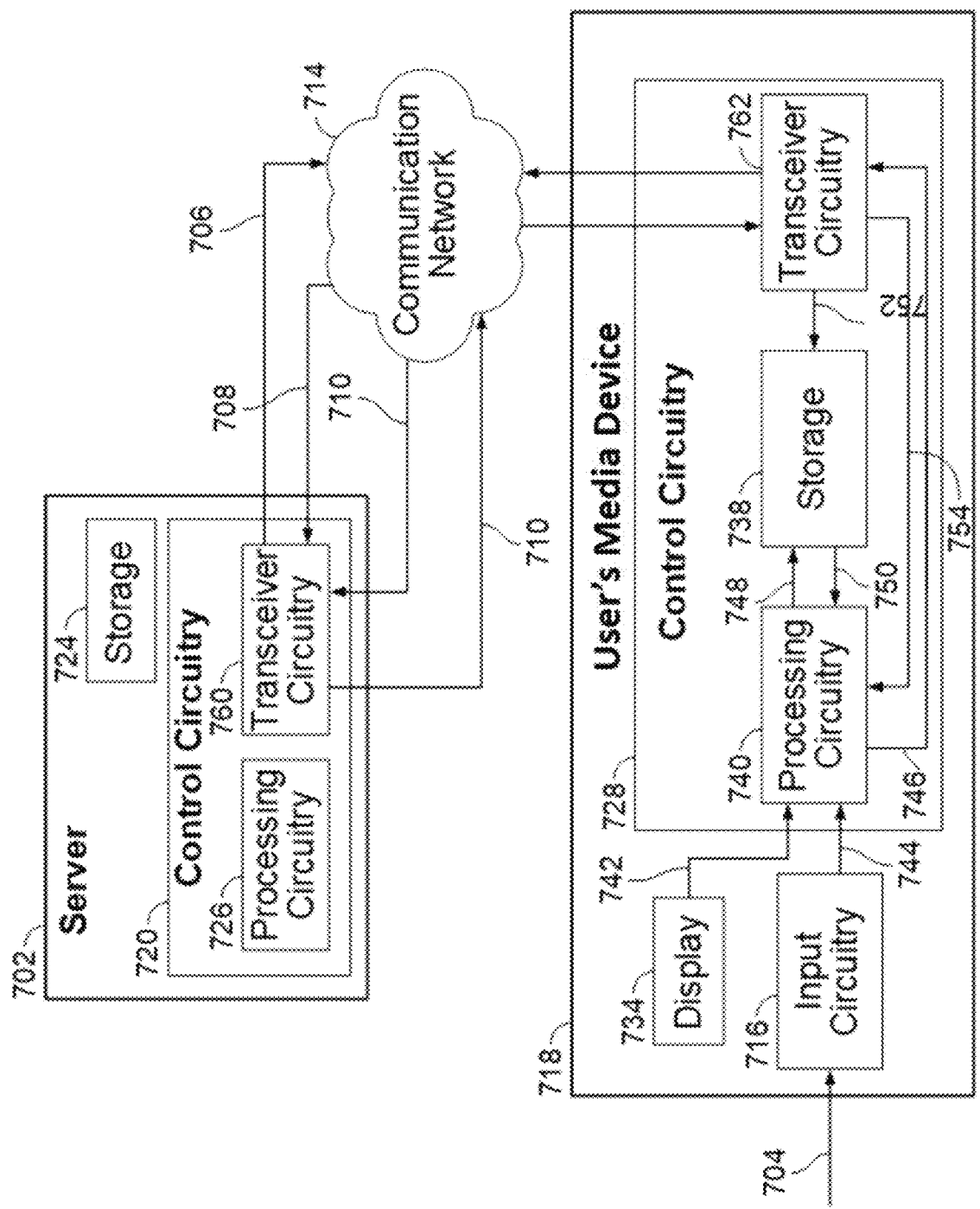
FIG. 7 is a block diagram of an example system for determining emotional responses for content, generating associated emotional arc, and determining insertions of secondary content, in accordance with some embodiments of the disclosure.

At block 203, a control circuitry or a system, such as the system depicted in FIG. 7, is used to calculate an average of all the emotional arcs from block 202 that were generated based on the biometric data of the first plurality of users. In one embodiment, the average may be a collective average of emotional arcs of all the users that have consumed the primary content. In another embodiment, the first plurality of users may be further categorized based on, for example, their age, gender, location, and profession, and an average may be taken for each categorized group. The first plurality of users may also be categorized based on number of times they consumed the primary content. In yet another embodiment, the first plurality of users may be categorized based on the time they consumed the primary content, such as during morning, afternoon, night, or during weekdays, or weekends. Separate averages may be computed based on each group categorized.

Figure 10:
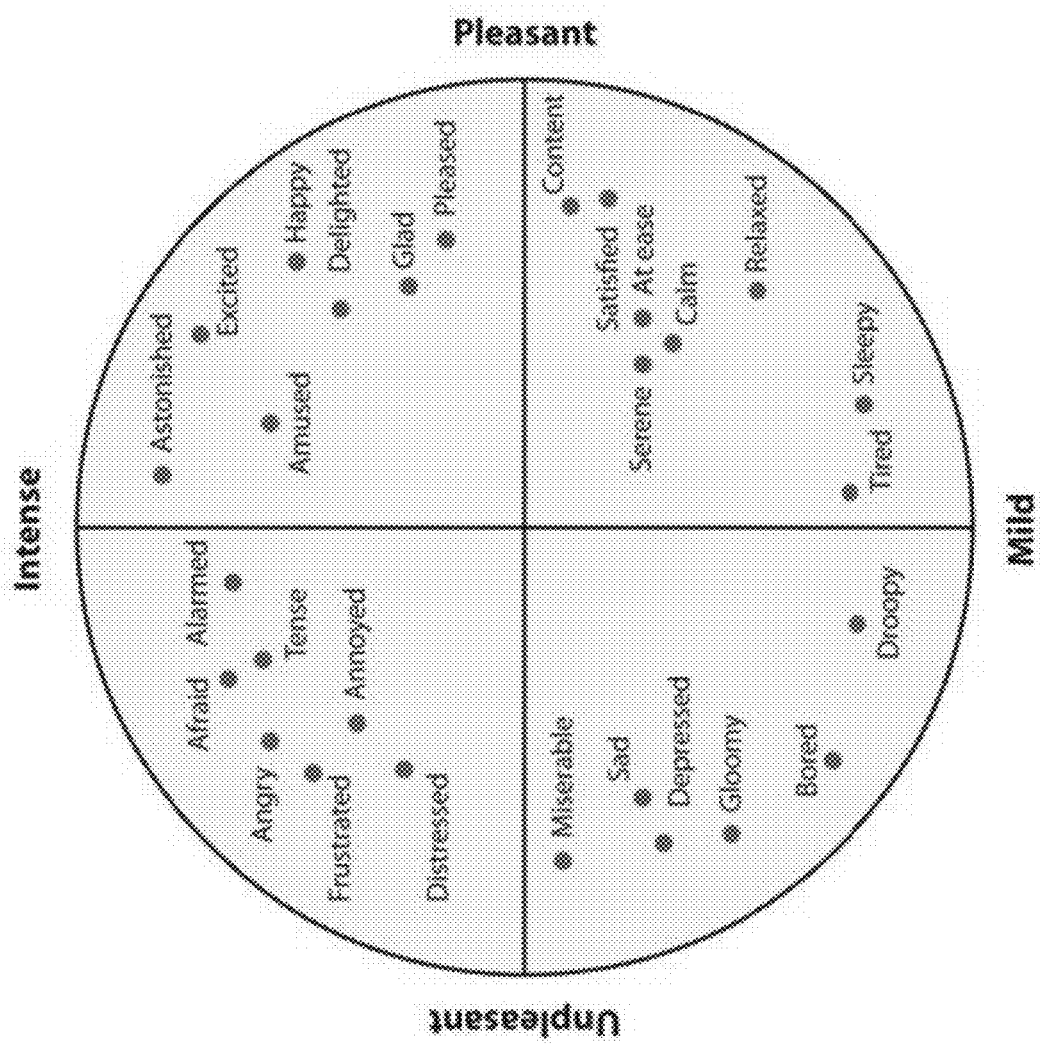
FIG. 10 is an example of a list of emotions and their variances from mild to intense and pleasant to unpleasant, in accordance with some embodiments of the disclosure.
Figure 11:
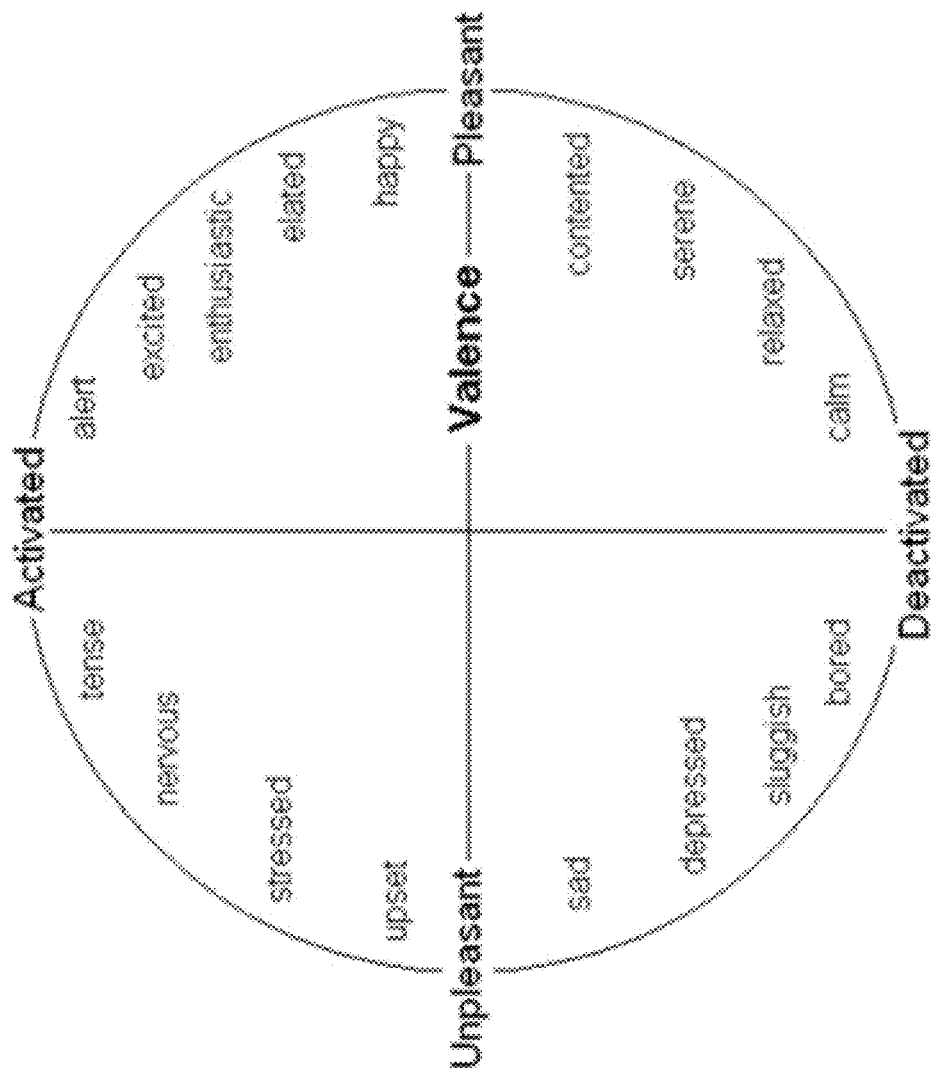
FIG. 11 is an example of a list of emotions and their variances from activated to deactivated and pleasant to unpleasant, in accordance with some embodiments of the disclosure.

In one embodiment, the emotional arc score from block 203 may be related to a type of emotion or a combination of emotions. For example, it may be related to an emotion of sadness, calm, contentment, excitement, or any of the emotional examples as depicted in FIGS. 10 and 11. It may also be a combination of emotions with different intensities and activation values.

In brief, stated another way, to obtain the average emotional arc as depicted in block 101, the system may cause the control circuitry to a) displaying the primary content to a plurality of users, b) obtaining their emotional response, which is based on their biometric data during their consumption of each frame, segment, scene, or some other portion of the primary content, c) determining an emotional arc for each user, and d) calculating an average emotional arc for all the users who have consumed the primary content. This approach may be applied to primary content that is an on-demand media asset as well as primary content that is a live broadcast.

When the primary content is an on-demand video asset steps in blocks 201-203 may be applied to obtain the average emotional arc. When the primary content is an on-demand video asset, to display the primary content, the system may access an on-demand database that includes a plurality of videos and receive a video stream that includes the primary content. The primary content may be displayed to a plurality of users, and, during its display, biometric data from the users' display devices is collected. Such biometric data is collected, such as on a frame-by-frame or scene-by-scene basis, while the primary content is being displayed. The various emotional states experienced during the consuming of the primary content are represented using Russell's circumplex model of emotions as mentioned above. Since each user's emotional response differs based on their personal feelings during the display of scenes in the primary content, each emotional arc generated for a user differs from that of another user. The system then calculates an average of all the users' emotional arcs to determine an average emotional arc.

The amount and type of emotional historical data gathered for emotional responses from users that have consumed primary content or at least a segment of the primary content may differ based on the type of primary content. For example, the amount and type of historical emotional data for primary content that is a live broadcast differs from the amount and type of emotional data if the primary content is an on-demand media asset. If the primary content is an on-demand media asset, then the emotional data, which is gathered through biometric scans and other input means, can be collected from a plurality of users that have previously consumed the on-demand primary content at any time prior to it being consumed by the current user. Such emotional data may be gathered at different times whenever the prior users are consuming the on-demand primary media. For example, one prior user may have consumed the primary content a day prior, another prior user may have consumed the primary content a week prior, and yet another prior user several months prior to the current date. The system may store all such emotional data and generate an average arc based on the emotional data collected over the lifetime of the primary content, over a past year, past month, or any defined period. If such data is available much prior to a current user consuming the primary content, the system will have adequate time and adequate data points to use such emotional data from prior users in estimating what emotional response to expect from a current user consuming the same primary content.

The prior emotional data for an on-demand primary media asset may be available for segments not yet consumed by the current user. For example, if the user is currently consuming the on-demand primary content and is current at a play position that is 20 minutes into a movie, the prior data may be available for scenes that are later in the primary content, such as scenes that will be at 30-, 40-, or 50-minute time markers in the primary content. Having such data available for upcoming segments of the primary content provides the system the foresight needed in estimating how the current user may react to an upcoming scene based on how most users reacted to such scene. Such data may be used in determining a type of secondary content to insert that will evoke a desired response when the primary content has evoked the estimated response in the current user.

In a different embodiment, when the primary content is a live broadcast, then the system will not have emotional data on upcoming scenes since no one has consumed scenes that have not yet been displayed. In this embodiment, the system may determine average emotional responses from previously consumed segments of the live broadcast and generate a projected emotional arc based on the consumed segments.

Referring back to FIG. 1, at block 102, the average emotional arc generated at block 101 is used as an estimate to predict likely emotions of the current user for the same primary content. In other words, the current user's emotional arc for the primary content is estimated based on the average emotional arc, also referred to as the default emotional arc, of the primary content, with offsets for how the current user's actual emotional arc, which includes values of activation and valence, differs during the consumption from the average activation and valence of the default emotional arc of previous viewers/users at the same point in the video. Accordingly, the system makes a prediction, based on the average emotional arc, of the likely emotional responses to expect from the current user when the current user is watching the primary content, i.e., the same as those in the average emotional arc or within a predetermined or threshold offset or range of the average emotional arc. The offsets and ranges may be defined by the system, the creator of the primary or secondary content, the network, the broadcast channel, or any entity affiliated with the service, production, or creation of the primary and secondary content. For example, if an average emotional arc value at a particular play position in the primary media asset is at a "73," the system may preset a range of +/−5 as an acceptable offset or range within which an actual emotional response if considered to be a match with the average emotional arc.

If the primary content is an on-demand media asset, then data for previously consumed segments of the primary content may be available for segments that are not yet consumed by the current user. As such, emotional arc values, i.e., activation and valence values, for an upcoming scene or time marker in the primary content may also be known based on the previously consumed data from other users, such as, for example, a scene relating to a car chase at a time marker 15:20 in a movie. Using this data, an estimate can be made on the activation and valence values to expect when the current user also watches the car chase that is occurring at a time marker 15:20 in the movie.

In one embodiment, a predetermined insertion point in the primary content may be designated at time marker 15:21, i.e., immediately following or perhaps still during the car chase scene in progress at 15:20. Based on the estimation made earlier of prior users' emotional states at time marker 15:20, secondary content that will likely have the highest impact based on the current user's emotional state is inserted into the video stream and displayed beginning at time marker 15:21.

To determine what type of secondary content will have the highest impact, the system analyzes a plurality of factors. These factors include estimated activation and valence values of the current user at the time marker 15:20, i.e., immediately preceding the time period designated for inserting the secondary content. Understanding the user's mood and emotional state immediately prior to the insertion point of the secondary content or secondary content allows the system to insert secondary content that utilizes the emotional state of the user and presents content that would further evoke the same or similar emotions, enhance the emotional state, or calm the emotional state, as desired. By utilizing the already-generated emotional state, the system aims to increase the user's attention and engagement with the secondary content having correlation with the generated emotional state. For example, displaying secondary content that correlates with the generated emotional state increases the likelihood of producing a higher impact and level of engagement with the secondary content. If such emotional correlation is not taken into account, then a non-targeted secondary content that is displayed at this insertion point may not relate to the emotional content of the primary content and may be at odds with the user's emotional state formed in response to the primary content.

For example, as mentioned above, in one embodiment, a scene displayed immediately preceding the time period designated for inserting the secondary content, such as immediately before the commercial break, may be a car chase. Based on the average emotional arc, the system may determine the emotional state of the user is likely one of excitement, fun, and high energy. Based on this knowledge, the system may insert secondary content showing a car for sale in which the secondary content displays the car being driven fast and taking sharp turns, i.e., evoking feelings of high energy, fun, and excitement. Inserting such a secondary content that is aligned with the user's emotional state may further enhance that state and lead to a higher level of engagement with the secondary content.

In addition to valence and activation, other factors analyzed may include trajectory of the emotional arc, acceleration or deceleration of the emotional arcs, such as rate of change, evoked by the primary content and the secondary content, content of the primary content at the point where the secondary content is to be inserted, and whether the current user's emotional arc is within a range of the average emotional arc.

Referring to block 103, if the values of the average emotional arc match the values of the current user's emotional arc, as shown in scenario 1, then, at block 104A, secondary content that is predetermined based on the values of the average arc is inserted. For example, as depicted in block 103, at play position 2, the value of the average emotional arc is 13 and the current user's emotional arc is also 13. Since the values are the same, the system determines that the actual user's response is in line with the average or expected emotional response and inserts secondary content that has been predetermined to display if an emotional value of 13 is met. A match between average and current emotional arc would also have been confirmed if the current user's actual emotional arc value was 12 or 14 at play position 2 if the system allowed an offset or range of +/−1 to be within the range. Any other offset or range value or values within a predetermined threshold may also be used to consider a match.

As described above, the system determines the actual user's response and compares it with the average or expected emotional response. To do so, the system collects the emotional data used to determine the average emotion arc and the current user's arc using similar methodologies to help make the data more consistent and accurate.

In another embodiment, if the values of the average emotional arc, which is used as an estimate for the current user, do not match the values of the current emotional arc, as shown in scenario 2, then the current values of the user's emotional arc are determined. As shown in block 103, in one embodiment the current value of the current user's emotional arc may be "7." Even if the system sets an allowed offset or range of +/−1 to be within the range of the average emotional arc, since "7" is far below the average emotional arc value of "13" at play position 2 in scenario 2, no match is confirmed. As such the system moves to block 104B and secondary content is designated for an associated emotional arc value, i.e., an emotional arc value of "7," if available, is inserted. If secondary content for an emotional arc value is not available, since it was not created or available in a database, then secondary content designated for a value closest to the determine current emotional arc value of "7" will be inserted.

Referring back to block 103, in one embodiment, the system may use the user's actual emotional arc, which is based on the user's current valence and activation score as a determination factor for determining what type of secondary content to be inserted. In one embodiment the system may look at any of the combinations of the average emotional arc scores and running emotional arc score of the user, for example, the system may look at 1) only the average emotional arc score, 2) only the user's running emotional score, or 3) a combination of both the average emotional arc score and the user's running emotional arc score. In yet another embodiment, the system may look at the average emotional score if a first threshold is met and if the threshold is exceeded then it may look at the running emotional arc score. The threshold may be set by the system and dynamically changed for different media assets. The first threshold may be set at a number that is in close proximity to the average emotional score, such as +/−2 for an emotional a certation play position and if that is exceeded then the user's running average score may be used. The close proximity may be a determining factor that the user's emotional state is within a close proximity to what was estimated as the emotional score at a certain play position.

Figure 3:
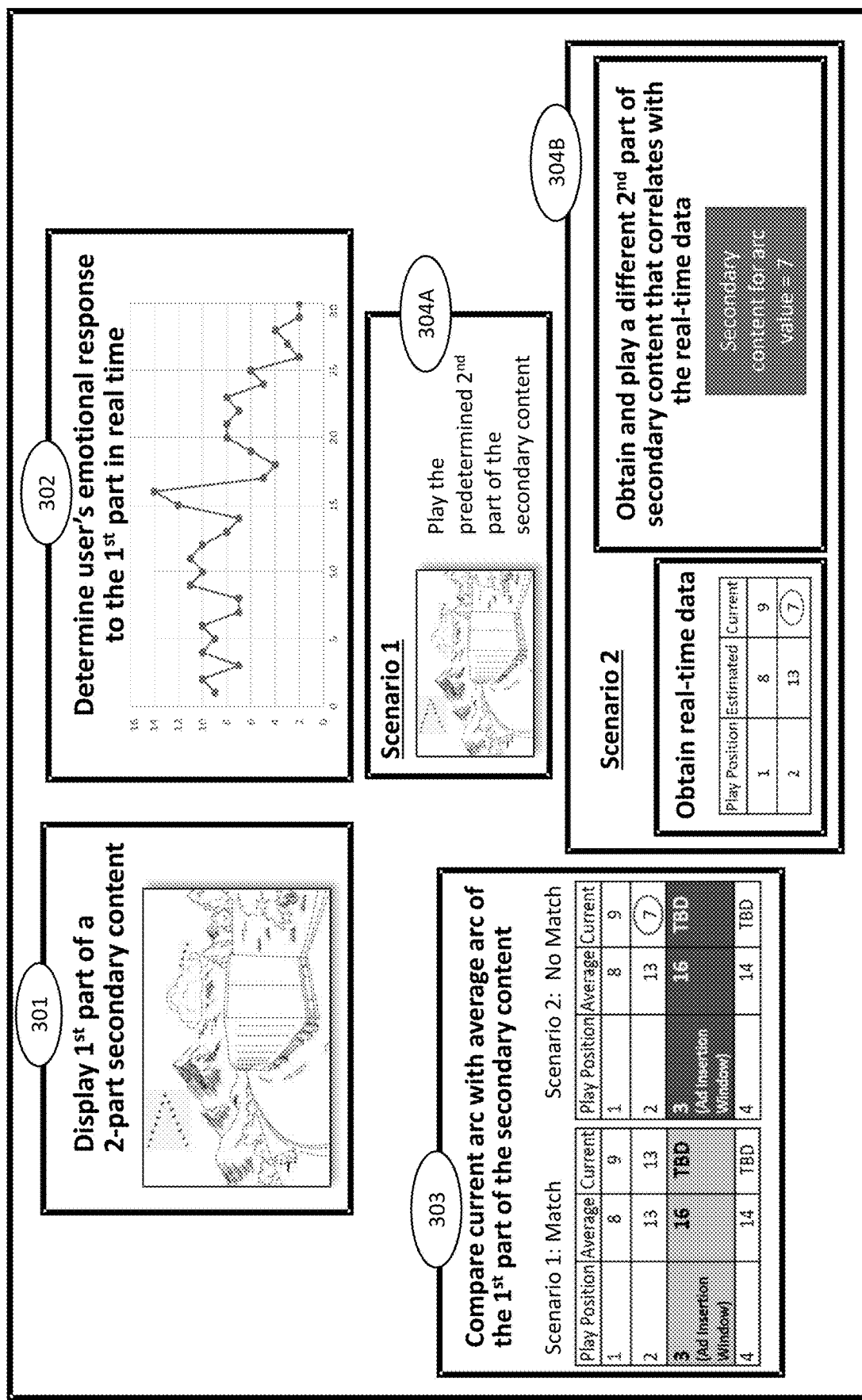
FIG. 3 is a block diagram of an example process for gauging a user's emotional response to a first part of secondary content and adjusting the second part based on the user's response, in accordance with some embodiments of the disclosure.

FIG. 3 is a block diagram of an example process for gauging a user's emotional response to a first part of a secondary content and adjusting a second part of the secondary content based on the user's emotional response, in accordance with some embodiments of the disclosure.

At block 301, a first part of a multiple-part secondary content is displayed. The multiple-part video may be a multiple-part secondary content, such as those shown during a Superbowl, where the content relates to the same product, but the messaging is split into two or more different sequential pieces of secondary contents that carry through a storyline.

At block 302, the user's emotional response to the first part of the secondary content may be determined using collected biometric data, and an emotional arc for the first part of the secondary content may be generated. The biometric data may be collected on a frame-by-frame or a segment-by-segment basis, on a periodic basis, or at certain key points in the primary content. The biometric data, such as heart rate, gaze and galvanic skin response may be collected via the display device's camera, heart rate monitor, sensors, and other components. The collected biometric data is indicative of the user's emotions in response to consuming the displayed primary content. The various emotional states experienced during the consumption of the primary content may be represented using Russell's circumplex model of emotions as discussed herein.

At block 303, the user's emotional response to the display of the first part of the secondary content may be compared with an average response, as mentioned earlier also referred to an estimated response. In one embodiment, the secondary content may have been previously shown to a plurality of users. Based on previous consumption of the secondary content, the system may collect statistics of the emotional impact experienced by those secondary content users who paid attention to the secondary content. These statistics, which may be obtained through biometric scans as mentioned above, include activation and valence values in connection with the users' emotional response to consuming the secondary content. The statistics may be used in generating an emotional arc for each user. A calculation may be made based on all the emotional arcs for all the users that have consumed the first part of the secondary content to generate an average emotional arc for the first part of the secondary content. The values of the emotional arc then used as an estimate of what type of emotional experience may be expected from the current user, who may be watching the first part of the secondary content for the first time.

As depicted in block 303, if the current user's emotional arc values match the average emotional arc values, then a match is confirmed. Any other offset or range value or values within a predetermined threshold may also be used to consider a match. The comparison may be performed on a scene-by-scene, frame-by-frame, or a segment-by-segment basis. It may also be performed overall for the entire secondary content.

As depicted in scenario 1, at play position 1 in the secondary content, the estimated value is "8" for an average emotional arc that was generated based on emotional values of users that have previously consumed the first part of the secondary content. The confirming of a match indicates that the actual emotional response of the user is the same or within an accepted range of the estimated emotional response. For example, the estimated emotional response value is "7" and if the acceptable range is a +/−1 then the response of "8" is considered to be a match. The confirming of the match also means that the emotional impact desired by the producer of the first part of the secondary content was matched with the actual emotional biometric data, or the generated emotional arc, of the current user when consuming the first part of the secondary content. When the match is made, the second part of the secondary content that was designated for a match is played.

As depicted in scenario 2, at play position 2 in the first part of the secondary content, the estimated value is "13" for an average emotional arc that was generated based on emotional values of users that have previously consumed the first part of the secondary content. Since the action value based on the current user's consumption of the first part of the secondary content is "7," which is far below the estimated value, the system may determine that a match is not made. Not having a match indicates that the actual emotional response of the user is not the same or within an accepted range of the estimated emotional response for the first part of the secondary content. No match also means that the emotional impact desired by the producer of the first part of the secondary content was not matched with the actual emotional biometric data, or the generated emotional arc, of the current user and instead the user had a different emotional response. When the match is not made, the second part of the secondary content that was designated for a match is not played, and instead, the system obtains a variation of the second part of the secondary content that matches the emotional arc value "7" of the user, if such a variation is already prepared and is available for playing.

In one embodiment, the secondary content may be shown in real time to all the users and may not have been shown previously to anyone. In such embodiments where all the users are shown the secondary content in real time, including the current user, biometric data for any prior consumption may not be available. As such, the system may collect the biometric data of the current user for the first part of the secondary content to determine its impact on the current user. The collected biometric data may be used to generate an emotional arc. Since the producer, creator, or provider of the secondary content may have a desired impact for the first part of the multiple-part secondary content, the user's collected biometric data for the first part may be compared with the desired emotional arc for the first part of the secondary content.

In one embodiment, if the emotional response of the user for the first part of the secondary content matches the desired emotional response, such as in scenario 1 at block 303, then the second part of the secondary content which was designated based on there being a match is played. In another embodiment, if the actual emotional response does not match the desired emotional response, such as in scenario 2 in block 303, then steps described in block 304B are executed.

FIG. 4 is a table of options for analyzing emotional responses relating to the primary content, secondary content, and the current user for determining impact of secondary content, in accordance with some embodiments of the disclosure.

In another embodiment, as depicted in "Option A," emotional responses to the primary content and real-time emotional responses from the current user may be analyzed to determine when and what type of secondary asset to insert in the primary content.

In this embodiment, the following options may be provided for inserting the secondary content into the primary content: a) flexibility to insert the secondary content anywhere in the primary content, b) restriction to insert the secondary content during a designated commercial break, and c) restriction to insert the secondary content during a commercial break that is taken depending upon the activity or stage of the primary content, such as occurrence of a commercial break whenever a time out is taken in a game.

In one embodiment, if the primary content is an on-demand media asset, then the primary content may be displayed to a plurality of users and their emotional responses collected to generate an average emotional primary arc. The system may then monitor the current user's emotional responses in real time to the displayed primary content, and, if the user's emotional arc values intersect with the average emotional primary arc, then a predetermined secondary content that has been designated for the emotional arc values may be displayed to the current user.

When there is flexibility to insert the secondary content anywhere in the primary content, then the system may monitor the emotional responses of the current user in real time and compare them to the average emotional arc. Whenever the emotional response is aligned with the average emotional arc or aligned within a range of the average emotional arc, the system may determine to insert the secondary content.

When the insertion of the secondary content is restricted, either based on a scheduled commercial break that is to occur at a designated time, such as 11:45 AM, or based on whenever a time out is taken in a game, the system may track the most recent emotional response of the current user to the primary content and use that to determine whether to insert the secondary content. For example, the system may determine that the emotional arc that is generated based on segments of the primary content already consumed is the emotional response desired by the maker of the secondary content as an insertion point of the secondary content into the primary content. This may be because the secondary content includes content that would likely continue the emotional response that was evoked by the current user and having such continuity in emotional response produces a higher impact for the secondary content. The maker of the secondary content may also look for a particular range of emotional arc values that would make the content of the secondary content more impactful, such an activation and valence value that is aligned with a certain level of excitement, to play secondary content that continues that feeling of excitement.

In another embodiment, if the primary content is a live broadcast, then the system may track the user's emotional responses to the live broadcast in real time and insert a designated secondary content that meets an emotional response value of the user.

In another embodiment, as depicted in "Option B," emotional responses to the secondary content and from a plurality of users that have previously consumed the secondary content and the real-time emotional responses from the current user as they watch the first part of the secondary content may be analyzed to determine when and what type or version of a second part of the secondary asset to insert in the primary content.

In this embodiment, secondary content may contain multiple parts where a first part is displayed during a first commercial break and a second part is displayed at a subsequent commercial break. For example, during events such as Super Bowl, Olympics, NBA games, which have millions of viewers tuned in to watch the live broadcast, secondary content having multiple parts is often displayed. Typically, the multiple-part secondary content, which is either a two-part or a three-part secondary content, is created by the same advertiser and is focused on a single product. Such multiple-part secondary content has a continuity of message from a first part to a second part (and possibly a third part).

In this embodiment, Option B, where the secondary content is split into multiple parts, the system determines the desired impact, i.e., emotional response, of the first part of the secondary content and measures it against the actual emotional response of the user consuming the first part of the secondary content. The process of determining the actual emotional response includes obtaining the user's biometric data through a plurality of means. As mentioned earlier, these include tracking the user using a camera of the media device displaying the secondary content, tracking the user's heart rate, motions, speech, and any other verbal or written content produced by the user in relation to the secondary content being consumed. The system may track that emotional response during the progress of the secondary content on a scene-by-scene or a segment-by-segment basis. These emotional responses include values of valence and activation, and such values, along with any other factors, may be used in generating an emotional arc of the user that correlates with the progress of display from start to end of the secondary content.

If it is a live broadcast, then the system may obtain the desired emotional response that is targeted by the creator of the secondary content. If it is an on-demand media asset where the secondary content has been shown to a plurality of users previously, then the system may obtain an average emotional arc that is generated based on prior consumption of the secondary content.

Whether it is the desired emotional response for a piece of secondary content that is being shown for the first time or it is an average emotional response of a previously consumed secondary content, the system may then compare either response to the current, actual response in real time from the current user.

If the user's response to the first part of the secondary content meets the desired emotional response, or the estimated emotional response, then the advertiser may continue to show the second part of the secondary content at a subsequent commercial break that has been designated based on the user's response meeting the desired or expected emotional response. This means that the type of emotional response that the creator of the secondary content desires to evoke with a two-part secondary content is on track. Because the first part of the secondary content matched with the desired or expected emotional response, there is a likelihood that the second part of the secondary content will also meet the desired or expected emotional response. On the other hand, in some cases, the system determines that the first part of the secondary content did not receive an emotional response that was desired or the average emotional response that was expected. Then the system may determine the values of the emotional response received based on the user's consumption and display a different version of the second part of the secondary content that matches the values of the emotional response received. In this scenario, the advertiser may have previously created a few variations of the secondary content that meet different ranges of emotional responses and have them ready to be displayed based on the values obtained of actual emotional response for a user that has consumed the first part of the secondary content.

In another embodiment, as depicted in "Option C," emotional responses may be determined for a multi-part secondary content as follows: 1) determine average emotional response to primary content and 2) insert the first part of the secondary content at a play position in the primary content where the average emotional response is as desired, 3) determine the real-time emotional response of the user to the inserted first part of the secondary content, 4) if the real-time emotional response of the user to the inserted first part is as desired, then insert the second part of the secondary content as predetermined, 5) if real-time emotional response of the user to the inserted first part is not as desired, determine actual value of emotional response and insert a second part of the secondary content that matches the actual value of the emotional response. These steps are further described below for different variations of flexibility allowed in where to insert the secondary content in the primary content, i.e., at predetermined points or whenever desired.

In one embodiment, an average emotional arc may be generated for primary content. The average emotional arc may be generated based on displaying the primary content to a plurality of users and obtaining their emotional responses as the primary content progresses from scene-to-scene, frame-to-frame, or segment-to-segment. An average emotional arc based on the collective emotional arcs of all the users who have previously consumed the primary content may be generated. The values of the average emotional arc may be displayed as data in a table or as a graph or any other desired format.

Based on the values of the average emotional arc, in one embodiment, if the system allows flexibility to insert secondary content at any stage in their primary content, then secondary content that is created for a targeted emotional response having a targeted emotional arc value, such as a specific rage of activation and valence values, may be displayed when the emotional arc values for the primary content reach the targeted emotional arc value.

In another embodiment, the system may not allow flexibility to insert secondary content at any stage in their primary content. The system may allow insertion of the secondary content only during a designated commercial break or during a commercial break that is taken depending upon the activity or stage of the primary content, such as occurrence of a commercial break whenever a timeout is taken in a game. In such embodiments, under Option C, the system may track the real-time emotional response of the user and obtain values of their emotional arc. If the last data point of the emotional response prior to the commercial break matches the average emotional arc calculated based on other user's emotional responses for the primary content, then the system may insert the secondary content based on values of the last emotional response. Any other offset or range value or values within a predetermined threshold may also be used to consider a match.

In yet another embodiment, at the first stage, under Option D, the system may the determine the average emotional arc for the primary content, based on prior consumption data, and insert a first part of the secondary content that meets a desired arc value in the average emotional arc. Next, the system may determine, in real time, the actual emotional response of the current user with respect to the first part of the secondary content. If the actual emotional response meets a desired emotional response that is targeted for the first part of the video, then the system may insert the second part of the secondary content as previously designated.

In yet another embodiment, as depicted in Option D, the primary content may be displayed to two separate groups of pluralities of users that have different viewpoints or interest. For example, the primary content may be a game between two NBA™ basketball teams, the Golden State Warriors™ and the Chicago Bulls™. In this embodiment, a first plurality of users may be selected as users that are fans of the Chicago Bulls and its second plurality of users may be selected as users that are fans of the Golden State Warriors. A determination of the user, or the group of users, aligned interest with a team may be obtained based on their profiles, prior consumption history, their statements made that may be captured by a microphone, their subscription to certain teams, their purchases of team merchandise that can be determined based on their online purchase history, or any other methods that can be used to determine their alignment with a team, such as either Chicago Bulls or Golden State Warriors. In a game between the two teams, depending on which team is winning, the emotional status of the first plurality of users may differ from the emotional status of the second plurality of users. The emotional status may also be similar between the two pluralities of users when the teams scores are in close proximity of each other creating a stressful emotional status in fans of both teams.

In this scenario, the system may obtain biometric data for the fans of the Chicago Bulls and separately for the fans of the Golden State Warriors. The system may generate an average emotional arc for all the Chicago Bulls fans and another emotional art for all the Golden State Warrior fans. The system may then determine the current user's response in real-time to determine whether the user is aligned with the Chicago Bulls or the Golden State Warriors. Depending on their alignment, the respective average emotional arc may be used. For example, based on the user's current emotional response, if the system determines that the user is aligned with the Golden State Warriors, then the system may compare the users emotional arc with the average emotional arc generated for the Golden State Warrior fans. If the current user's emotional arc had a play position in the game is same or within a range of values of the average emotional arc generated for the Golden State Warrior fans, then the system may insert secondary content that has been targeted for the value of the average emotional arc. Although a sports example has been used to illustrate how opposing views, different views, different interest, and different affiliations can be captured through obtaining data and grouping users based on their interests and affiliations, the embodiments are not so limited. For example, differing views, interests, for any work, business, or general day-to-day life matters where different interest and affiliations exist can also be captured through the described embodiments.

Although some combinations of displaying a video to a first and/or a second plurality of users, along with various combinations or generating average emotional arcs and current emotional arc, and comparison between the emotional arcs, are described, the embodiments are not so limited and other combinations are also contemplated.

Figure 5:
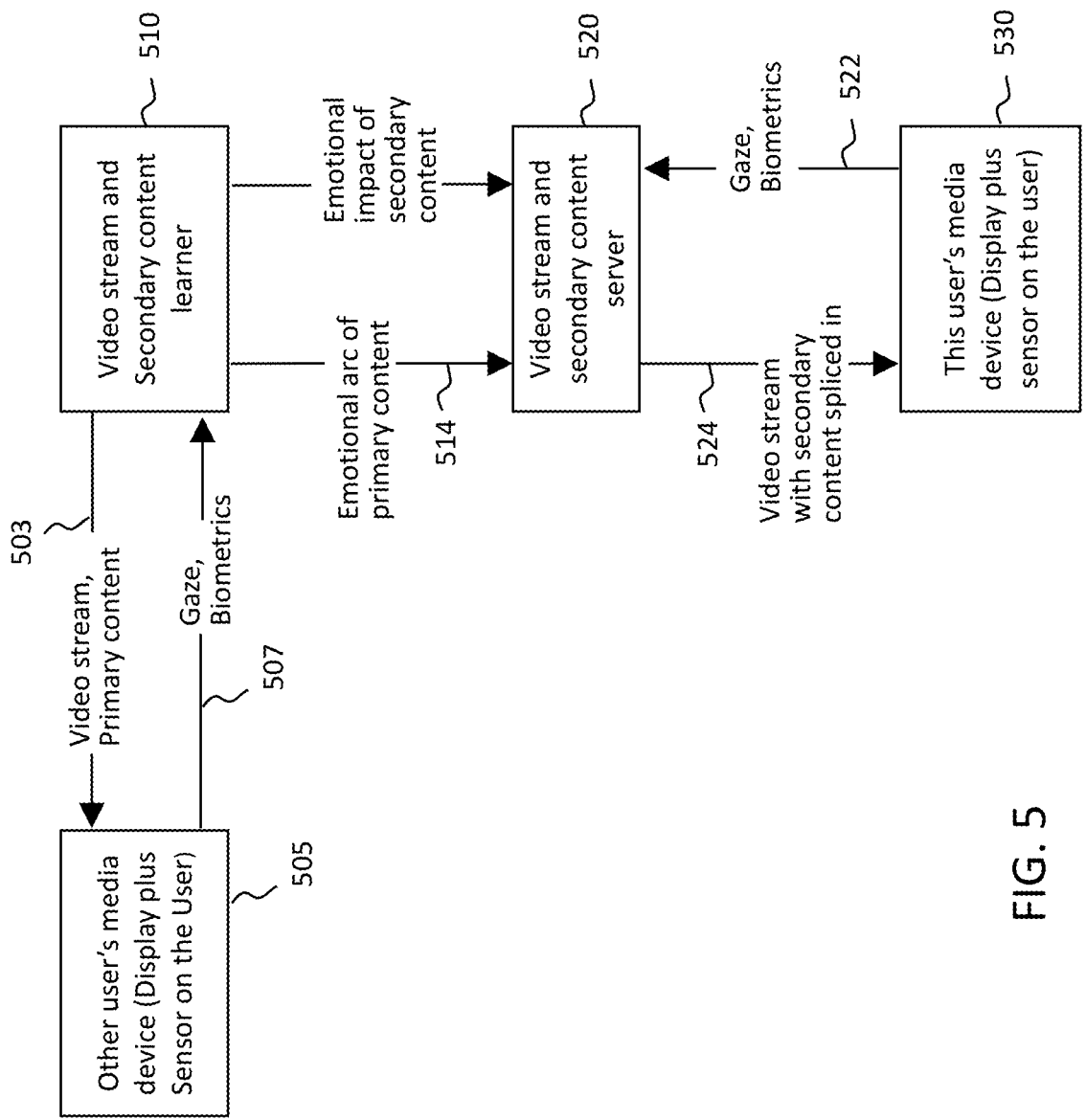
FIG. 5 is a block diagram of various components of a system for determining emotional arcs and inserting secondary content, in accordance with some embodiments of the disclosure.

FIG. 5 is a block diagram of various components of a system for determining emotional arcs and inserting secondary content, in accordance with some embodiments of the disclosure. In one embodiment, a media device associated with a current user, media devices associated with a plurality of users, a video stream and secondary content learner, and a video stream and secondary content server may be used for the processes described in FIGS. 1-4 and 6.

In one embodiment, primary content is sent from a video stream and secondary content learner or device 510 to other user's media device 505, i.e., not the current user, via video stream 503. The primary content may be sent to the user's media device 505 in response to the other user's media device(s) 505 requesting the primary content for consumption from the video stream and secondary content learner or device 510. The primary content may be an on-demand media asset or a live broadcast.

In one embodiment, the media device 505 may include a display and a plurality of sensors and biometric scanning devices. For example, the device 505 may include and/or otherwise be operatively or communicatively coupled to a camera, a motion detector, a gyroscope, and an accelerometer, and biometric devices such as a heart rate monitor, and a pulse or skin sensor. The device 505 may also include a processor connected to control circuitry, such as displayed in an example device of FIG. 8, for executing instructions to perform the functions relating to obtaining the viewer's emotional data. For example, the control circuitry may activate the camera associated with the device 505 to track the viewer's gaze and determine if the viewer's gaze is focused at the displayed content in the primary content. The control circuitry may also access the gyroscope and accelerometer there to determine the viewers' motions in response to watching the primary content. The control circuitry may also monitor the other user's heartbeat to determine the other user's emotions. In addition to the above-mentioned components of the media device, other components and sensors associated with the other user's media device may also be used by control circuitry to monitor the other user's emotional responses throughout the course of the display of the primary content from its start to end.

In one embodiment, the other user's gaze and other biometric data relating to the other user's emotional response to consuming various frames, scenes, and segments of the primary content obtained by the media device 505 may be sent to the video stream and secondary content learner service or device 510 as depicted at 507.

The video stream and secondary content learner service or device 510 receives the gaze and biometric data of each other user, from a plurality of other users, and generates an emotional arc for the other user. The video stream and secondary content learner service or device 510 also calculates average activation and valence values based on the gaze and biometric data received from each other user to generate an average that represents all the plurality of other users. The emotional arc includes the average activation and valence values of the plurality of other users and in some embodiments, it includes activating, valence, and other factors that relate to the emotional response by the plurality of other users that have consumed the primary content. The video stream and secondary content learner service or device 510 transmits the generated average emotional arc to the Video stream and secondary content server 520.

The video stream and secondary content server 520 receives at 514 the average emotional arc generated on the basis of emotional data from the plurality of other users that have consumed the primary content and also receives at 522 emotional response data (e.g., gaze and biometric data) from a current user's media device 530. The video stream and secondary content server 520 generates an emotional arc for the current user based on the received gaze and biometric data, for instance. The video stream and secondary content server 520 then compares the average emotional arc with the current emotional arc of the current viewer.

As discussed above, the average emotional arc and the current emotional arc reflect emotional responses of respective user(s) over a course of time of consumption or playback of the primary content. Using the data of both arcs, the video stream and secondary content server 520 determines intersecting points between the average emotional arc and the current emotional arc, where points of intersection are combined values of each respective arc. The determination comprises determining play positions in the primary content where both arcs have the same values or values within a threshold range of each other. The video stream and secondary content server 520 may then insert secondary content where the values are within the threshold range of each other.

Likewise, a first part of secondary content may be sent from the video stream and secondary content learner or device 510 to the user's media device 505 as depicted at 503. Similar processes as mentioned above for the primary content may be performed for the first part of the secondary content to generate an average emotional arc on the basis of emotional data from the plurality of users that have consumed the first part of the secondary content and also a current emotional arc for the current user consuming the first part of the secondary content. The video stream and secondary content server 520 may then compare the average emotional arc with the current emotional arc of the current user for the first part of the secondary content. If the values of both arcs are the same or within a range, such as a predetermined threshold range, of each other, then the video stream and secondary content server 520 may insert a second part of the secondary content as designated for the matched value. If the values do not match or are not within the threshold range of each other, then a second part of the secondary content, if available, for the value determined at the play position as the current emotional arc value will be inserted. Although only certain combinations have been described in reference to FIG. 5, other combinations as described in FIG. 4 may also be implemented using the components of FIG. 5.

Figure 6:
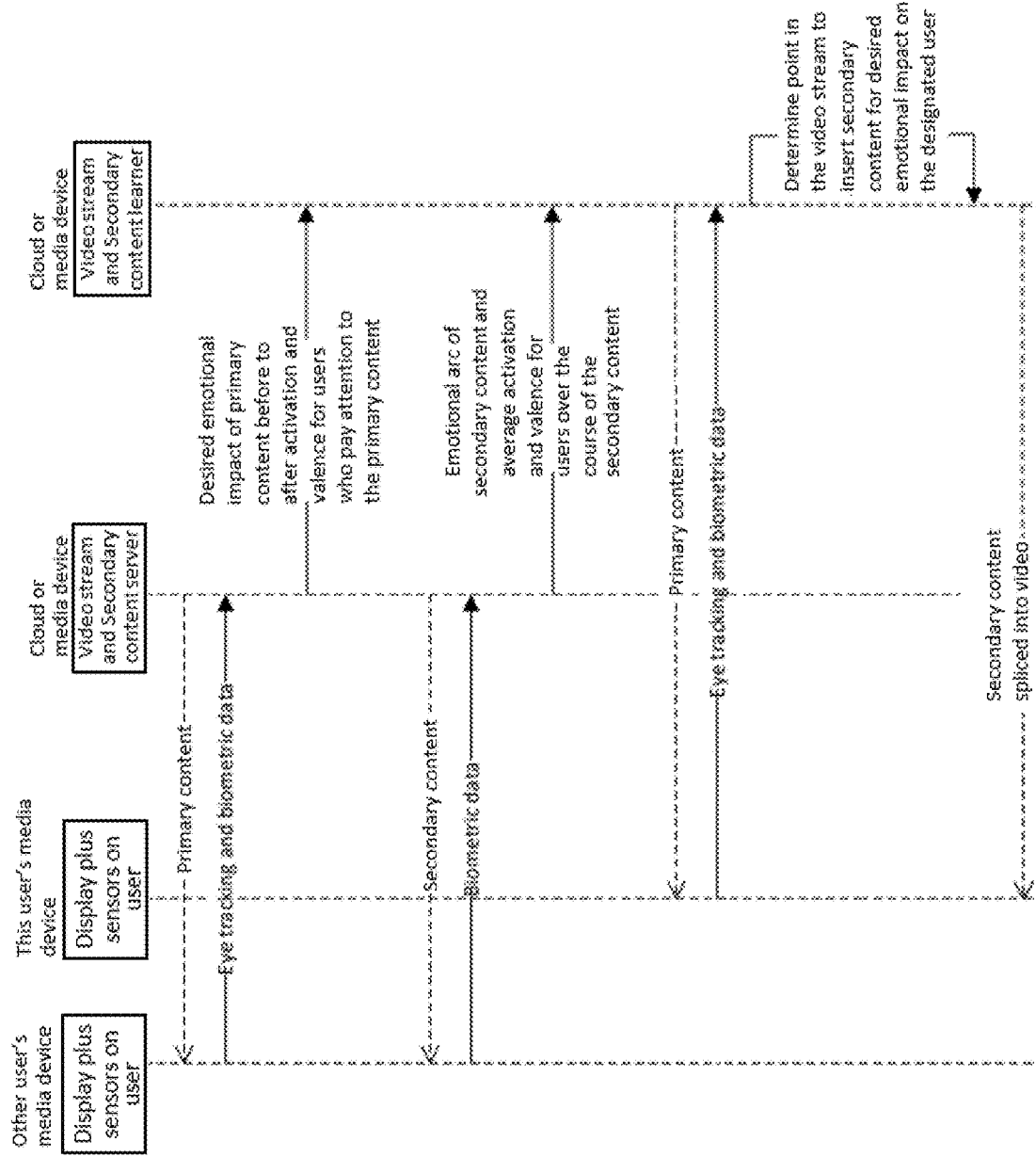
FIG. 6 is a block diagram of communications between different components of the system for determining emotional arcs and inserting secondary content, in accordance with some embodiments of the disclosure.

FIG. 6 is a block diagram of communications between different components of the system for determining emotional arcs and inserting secondary content, in accordance with some embodiments of the disclosure. The communications described in this figure relate to actions performed by the components of the system in FIG. 5. For example, some of these actions performed include executing processes described in FIGS. 1-4.

As depicted in FIG. 6, in some embodiments, a primary content is transmitted from the video stream and secondary content learner, such as the video stream and secondary content learner 510 depicted in FIG. 5, to a group of users (also referred to as other users) on their media devices, such as media device 505 depicted in FIG. 5. The primary content, in one embodiment, is sent to the others users to survey and get their emotional response. The emotional responses from the transmitted primary content are collected and transmitted to the video stream and secondary content server, such as the video stream and secondary content server 520 in FIG. 5.

Likewise, a first part of a secondary content, such as secondary content having multiple parts as described in the description related to FIG. 3 above, may also be transmitted from the video stream and secondary content learner 510 to media devices 505 of other users to obtain their emotional responses. The first part of the secondary content may also be sent to the current user to get their emotional response.

The video stream and secondary content server 520 may perform analysis of the emotional data received and generate an average emotional arc that can be used as an estimate for the current user.

The video stream and secondary content server 520 may then transmit the primary content to the current viewer and gather the current viewer's actual emotional response. The actual emotional response, which may be used to generate a user's emotional arc, may then be compared with the average emotional arc to determine if the estimates were accurate. If there is a variance with the estimate, such as due to the current user's emotional response being different to the primary content than the group of users surveyed previously or due to the current user having consumed the primary content multiple times, then an adjustment or offset to the average emotional arc based on the amount of variance is made.

Once a determination is made that the current user's emotional arc is within a threshold of the average emotional arc, or adjustments and offsets are made to bring them both within a threshold variance, then the video stream and secondary content server 520 may splice the video stream, as depicted in 524 of FIG. 5. The video stream and secondary content server 520 may insert the secondary content into the spliced video stream and transmit it to the current user's media device, such as media device 530 depicted in FIG. 5.

FIG. 7 is a block diagram of an example system for determining emotional responses for videos, generating associated emotional arc, and determining insertions of secondary content, in accordance with some embodiments of the disclosure. In FIG. 7, an audio/video system 700 is configured, in accordance with some embodiments of the disclosure. In some embodiment, one or more parts of, or the entirety of system 700, may be configured as a system implementing various features, processes, functionalities, tables, emotional scores, activation and valence values, user interfaces, and components for processing functionality described in FIGS. 1-4 and 6. Although FIG. 7 shows a certain number of components, in various examples, system 700 may include fewer than the illustrated number of components and/or multiples of one or more of the illustrated number of components.

System 700 is shown to include a computing device 718, a server 702 and a communication network 714. It is understood that while a single instance of a component may be shown and described relative to FIG. 7, additional instances of the component may be employed. For example, server 702 may include, or may be incorporated in, more than one server. Similarly, communication network 714 may include, or may be incorporated in, more than one communication network. Server 702 is shown communicatively coupled to computing device 718 through communication network 714. While not shown in FIG. 7, server 702 may be directly communicatively coupled to computing device 718, for example, in a system absent or bypassing communication network 714.

Communication network 714 may comprise one or more network systems, such as, without limitation, an Internet, LAN, WIFI or other network systems suitable for audio processing applications. In some embodiments, system 700 excludes server 702, and functionality that would otherwise be implemented by server 702 is instead implemented by other components of system 700, such as one or more components of communication network 714. In still other embodiments, server 702 works in conjunction with one or more components of communication network 714 to implement certain functionality described herein in a distributed or cooperative manner. Similarly, in some embodiments, system 700 excludes computing device 718, and functionality that would otherwise be implemented by computing device 718 is instead implemented by other components of system 700, such as one or more components of communication network 714 or server 702 or a combination. In still other embodiments, computing device 718 works in conjunction with one or more components of communication network 714 or server 702 to implement certain functionality described herein in a distributed or cooperative manner.

Computing device 718 includes control circuitry 728, display 734 and input circuitry 716. Control circuitry 728 in turn includes transceiver circuitry 762, storage 738, which receives input from transceiver circuitry 762 via 752, and processing circuitry 740. In some embodiments, computing device 718 or control circuitry 728 may be configured as media device 505 or 530 of FIG. 5.

Server 702 includes control circuitry 720 and storage 724. Each of storages 724 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 724, 738 may be used to store various types of content, metadata, and or other types of data (e.g., they can be used to store activation and valence values, emotional arc values, and biometric data from users). Nonvolatile memory may also be used (e.g., to launch a boot-up routine and other instructions). Cloud-based storage may be used to supplement storages 724, 738 or instead of storages 724, 738. In some embodiments, the audio and/or video portion(s) of the breakout room session may be recorded and stored in one or more of storages 712, 738.

In some embodiments, control circuitry 720 and/or 728 executes instructions for an application stored in memory (e.g., storage 724 and/or storage 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored in storage 724 and/or 738 and executed by control circuitry 720 and/or 728. In some embodiments, the application may be a client/server application where only a client application resides on computing device 718, and a server application resides on server 702.

The application may be implemented using any suitable architecture. For example, it may be a stand-alone application wholly implemented on computing device 718. In such an approach, instructions for the application are stored locally (e.g., in storage 738), and data for use by the application is downloaded on a periodic basis (e.g., from an out-of-band feed, from an Internet resource, or using another suitable approach). Control circuitry 728 may retrieve instructions for the application from storage 738 and process the instructions to perform the functionality described herein. Based on the processed instructions, control circuitry 728 may determine a type of action to perform in response to input received from input circuitry 716 or from communication network 714. For example, in response to determining that a current emotional arc value meets the average emotional arc value, the control circuitry 728 may perform the steps of processes described in FIGS. 1-3 to insert secondary content associated with the average arc value.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 714). In another example of a client/server-based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 728) and/or generate displays. Computing device 718 may receive the displays generated by the remote server and may display the content of the displays locally via display 734. This way, the processing of the instructions is performed remotely (e.g., by server 702) while the resulting displays, such as the display windows described elsewhere herein, are provided locally on computing device 718. Computing device 718 may receive inputs from the user via input circuitry 716 and transmit those inputs to the remote server for processing and generating the corresponding displays. Alternatively, computing device 718 may receive inputs from the user via input circuitry 716 and process and display the received inputs locally, by control circuitry 728 and display 734, respectively.

Server 702 and computing device 718 may transmit and receive content and data such as biometric data from user that have consumed a primary or secondary content, data related to a user's gaze when consuming a video, emotional arc data, and data relating to an emotional impact threshold as desired by the creator of the secondary content, and video and media content via communication network 714. For example, server 702 may be a secondary content provider, and computing device 718 may be a media device configured to display the secondary content provided as depicted in FIGS. 5 and 6. Control circuitry 720, 728 may send and receive commands, requests, and other suitable data via links 706, 708, and 710 through communication network 714 using transceiver circuitry 760, 762, respectively. Control circuitry 720, 728 may communicate directly with each other using transceiver circuits 760, 762, respectively, avoiding communication network 714.

It is understood that computing device 718 is not limited to the embodiments and methods shown and described herein. In nonlimiting examples, computing device 718 may be a user's media device, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a smartphone, or any other device, computing equipment, or wireless device, and/or combination of the same capable of suitably collecting biometric and gaze data, displaying primary and secondary content, and displaying emotional arcs.

Control circuitry 720 and/or 718 may be based on any suitable processing circuitry such as processing circuitry 726 and/or 740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 718 are configured to collect display primary or secondary content, collect user's biometric and gaze data, generate emotional arcs, calculate an average emotional arc, determine current emotional values of a current user, generate current emotional arcs, compare average with current emotional arcs, determine a point of insertion of secondary content, determine which secondary content, such as a secondary content, to insert, access secondary content from various databases and services, insert secondary content into primary content, and collect emotional data relating to a first part of secondary content to make decision on when or which second part of secondary content to insert in the primary content and perform various related processes described and shown in connection with FIGS. 1-4, 6, 9A-D and 12.

Computing device 718 receives a user input 704 at input circuitry 716. For example, computing device 718 may receive a input like a user's emotional response to a scene, frame, or segment of a primary or secondary content consumed, which may be received be sent to the computing device from a camera, heartbeat measuring components, or motion detecting components that are associated with the user's media device. In some embodiments, computing device 718 is a media device associated with the user that collects gaze and biometric data and displayed primary and secondary content. It is understood that computing device 718 is not limited to the embodiments and methods shown and described herein. In nonlimiting examples, computing device 718 may be a personal computer (PC), a laptop computer, a tablet computer, a handheld computer, a stationary telephone, a personal digital assistant (PDA), a mobile telephone, a smartphone, or any other type of media device or equipment, computing equipment, or wireless device, and/or combination of the same.

User input 704 may be received from a user selection-capturing interface that is separate from device 718, such as a remote-control device, trackpad or any other suitable user movement sensitive or capture devices, or as part of device 718, such as a touchscreen of display 734. Transmission of user input 704 to computing device 718 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 716 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 740 may receive input 704 from input circuit 716 via 744, display 734, via 742, storage 738, via 750, and transceiver circuitry 762 via 754. Processing circuitry 740 may convert or translate the received user input 704 that may be in the form of voice input into a microphone, or movement or gestures to digital signals. In some embodiments, input circuit 716 performs the translation to digital signals. In some embodiments, processing circuitry 740 (or processing circuitry 726, as the case may be) carries out disclosed processes and methods. Processing circuitry 740 may also provide input into transceiver circuitry 762 via 746, storage 738, via 748. For example, processing circuitry 740 or processing circuitry 726 may perform processes described in FIGS. 1-4, and 6.

Figure 8:
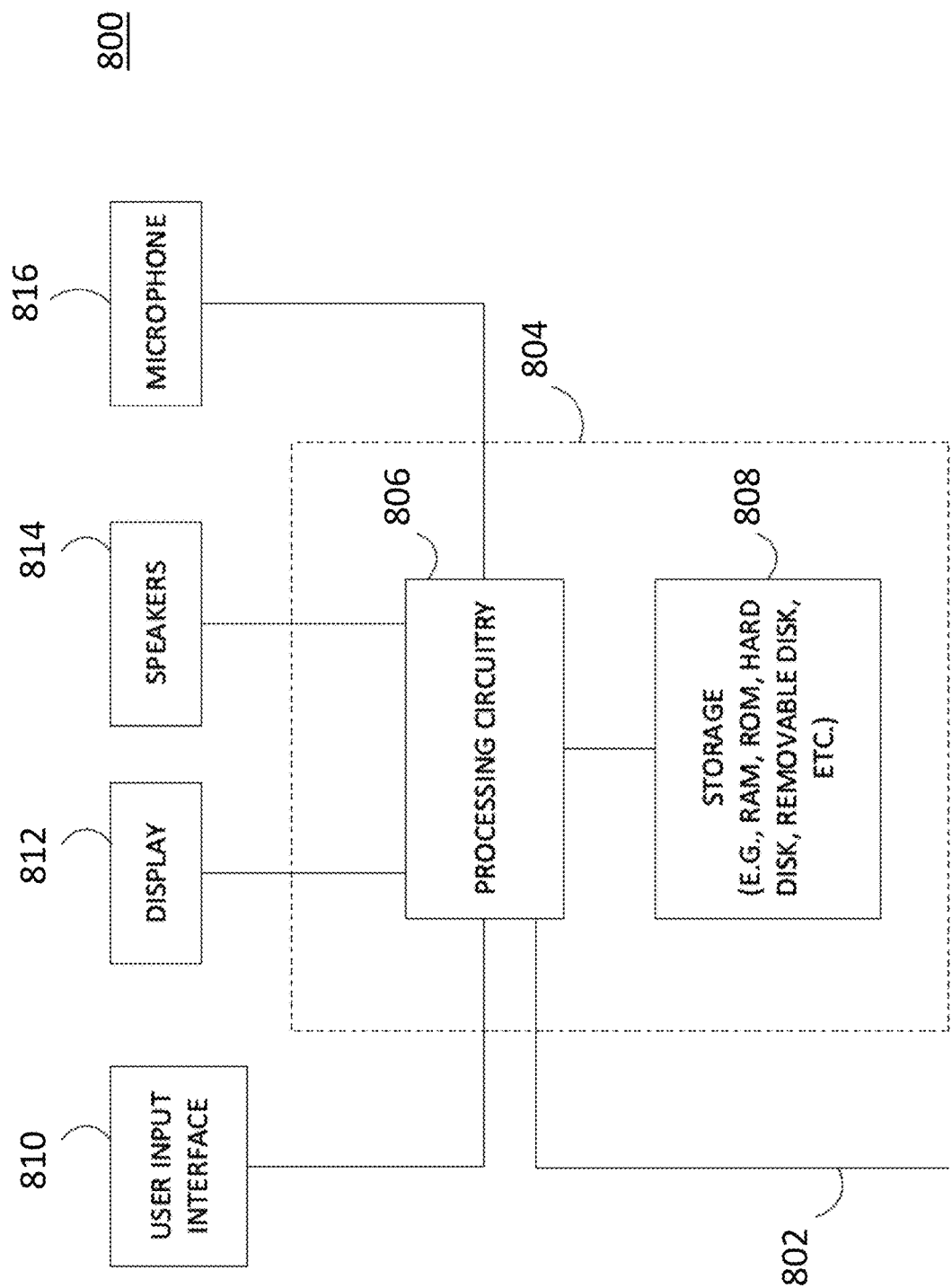
FIG. 8 is a block diagram of a user's media device, in accordance with some embodiments of the disclosure.

FIG. 8 is a block diagram of a user's media device, in accordance with some embodiments of the disclosure. In an embodiment, the user's media device 800, is the same media device 718 of FIG. 7. The user's media device 800 may receive content and data via input/output (I/O) path 802. The I/O path 802 may provide audio content (e.g., speech input from a user consuming a primary or secondary content) and data, such as gaze or biometric data, to control circuitry 804, which includes processing circuitry 806 and a storage 808. The control circuitry 804 may be used to send and receive commands, requests, and other suitable data using the I/O path 802. The I/O path 802 may connect the control circuitry 804 (and specifically the processing circuitry 806) to one or more communications paths. I/O functions may be provided by one or more of these communications paths but are shown as a single path in FIG. 8 to avoid overcomplicating the drawing.

The control circuitry 804 may be based on any suitable processing circuitry such as the processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The methods and processes involved in determining topics of collecting display primary or secondary content, collecting user's biometric and gaze data, generating emotional arcs, calculate an average emotional arc, determining current emotional values of a current user, generate current emotional arcs, comparing average with current emotional arcs, determining a point of insertion of secondary content, determining which secondary content to insert, accessing secondary content from various databases and services, inserting secondary content into primary content, and collecting emotional data relating to a first part of secondary content to make decision on when or which second part of secondary content to insert in the primary content and perform various related processes described and shown in connection with FIGS. 1-4, 6, 9A-D and 12 as described herein can be at least partially implemented using the control circuitry 804. In one embodiment, automatic refers to, performing the function without user intervention. The processes as described herein may be implemented in or supported by any suitable software, hardware, or combination thereof. They may also be implemented on servers, such as server 102 in FIG. 7, on remote servers, or across both.

In client-server-based embodiments, the control circuitry 804 may include communications circuitry suitable for communicating with one or more servers that may at least implement the storing of activation and valence values, emotional arc values, and biometric data from users and at least implement processes to display primary or secondary content, collect user's biometric and gaze data, generate emotional arcs, calculate an average emotional arc, determine current emotional values of a current user, generate current emotional arcs, compare average with current emotional arcs, determine a point of insertion of secondary content, determine which secondary content to insert, access secondary content from various databases and services, insert secondary content into primary content, and collect emotional data relating to a first part of secondary content to make decision on when or which second part of secondary content to insert in the primary content and perform various related processes described and shown in connection with FIGS. 1-4, 6, 9A-D and 12.

The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user media devices or various servers, such as advertising servers.

Memory may be an electronic storage device provided as the storage 808 that is part of the control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 808 may be used to store various types of content described herein, such as valence values, emotional arc values, and biometric data from users. Nonvolatile memory may also be used (e.g., to launch a boot-up routine and other instructions). Cloud-based storage, described in relation to FIG. 7, may be used to supplement the storage 808 or instead of the storage 808.

The control circuitry 804 may include audio generating circuitry and tuning circuitry, such as one or more analog tuners, audio generation circuitry, filters or any other suitable tuning or audio circuits or combinations of such circuits. The control circuitry 804 may also include scaler circuitry for upconverting and down converting content into the preferred output format of the media device 800. The control circuitry 804 may also include digital-to-analog converter circuitry and analog-to-digital converter circuitry for converting between digital and analog signals. The tuning and encoding circuitry may be used by the conferencing device 800 to receive and to display, to play, or to record primary or secondary content. The circuitry described herein, including, for example, the tuning, audio generating, encoding, decoding, encrypting, decrypting, scaler, and analog/digital circuitry, may be implemented using software running on one or more general purpose or specialized processors. If the storage 808 is provided as a separate device from the media device 800, the tuning and encoding circuitry (including multiple tuners) may be associated with the storage 808.

The user may utter an emotional response to the control circuitry 804, such as during consumption of a primary or secondary content, which are received by the microphone 816. The microphone 816 may be any microphone (or microphones) capable of detecting human speech. The microphone 816 is connected to the processing circuitry 806 to transmit detected voice input or commands and other speech thereto for processing. In some embodiments, voice assistants (e.g., Siri, Alexa, Google Home and similar such voice assistants) receive and process the voice commands and other speech.

The media device 800 may include an interface 810. The interface 810 may be any suitable user interface, such as a remote control, mouse, trackball, keypad, keyboard, touch screen, touchpad, stylus input, joystick, or other user input interfaces. A display 812 may be provided as a stand-alone device or integrated with other elements of the media device 800. For example, the display 812 may be a touchscreen or touch-sensitive display. In such circumstances, the interface 810 may be integrated with or combined with the microphone 816. When the interface 810 is configured with screen, such a screen may be one or more of a monitor, a television, a liquid crystal display (LCD) for a mobile device, active-matrix display, cathode ray tube display, light-emitting diode display, organic light-emitting diode display, quantum dot display, or any other suitable equipment for displaying visual images. In some embodiments, the interface 810 may be HDTV-capable. In some embodiments, the display 812 may be a 3D display. The speaker (or speakers) 814 may be provided as integrated with other elements of the media device 800 or may be a stand-alone unit. In some embodiments, the display 812 may be outputted through speaker 814.

The device 800 of FIG. 8 can be implemented in system 700 of FIG. 7 as media device 718, but any other type of media device suitable for implementing processes to display primary or secondary content, collect user's biometric and gaze data, generate emotional arcs, calculate an average emotional arc, determine current emotional values of a current user, generate current emotional arcs, compare average with current emotional arcs, determine a point of insertion of secondary content, determine which secondary content to insert, access secondary content from various databases and services, insert secondary content into primary content, and collect emotional data relating to a first part of secondary content to make decision on when or which second part of secondary content to insert in the primary content and perform various related processes described and shown in connection with FIGS. 1-4, 6, 9A-D and 12 may also be used.

FIG. 9A is an example of an activation graph, in accordance with some embodiments of the disclosure, and FIG. 9B is an example of a valence graph, in accordance with some embodiments of the disclosure.

In an embodiment, the emotional state of a viewer is represented using a Russell's circumplex model of emotions, examples of which are displayed in FIGS. 10 and 11. Other models, in addition to Russell's circumplex model may also be used. The models are used to represent user emotions within a two-dimensional circle that includes two numbers: one number for activation and one number for valence. An example of an activation graph is displayed in FIG. 9A, and a valence graph is displayed in FIG. 9B.

Activation relates to intensity indicating how energized the user is when consuming a video, such as the primary or secondary content described herein. As such, activation is associated with stimuli that evoke a certain part of the brain with positive high-arousal and negative low-arousal emotions. It also relates to the strength of the user's person's inclination to take some action based on the evoked emotion rather than taking no action.

Valence relates to a positive or negative aspect of an emotion. It indicates the level or degree of how positive or negative the feelings of the user are, such as in response to consuming a video.

Valence and activation work together to determine the overall emotion response of the user. Collectively they represent an emotional impact on a user and determine the influence on a user the emotional impact has caused for the user to be motivated to take an action based on their emotional response.

As depicted in FIG. 9C, an average emotional arc is calculated based on the average valence and activation values. The average emotional arc of a video is represented by the changing average activation and valence of the previous viewers of that video captured over the course of the video. The average emotional arc is then used as an estimate for a current user. For example, when a current user has not already consumed the current video, the current user's emotional arc for that video is estimated based on the average emotional arc of the video, with offsets for how the user's actual activation and valence during the consumption differ from the average activation and valence of previous viewers at the same point in the video. The position of the video at which the secondary content may be best inserted for this current user is determined based on the similarity of the viewer's estimated activation and valence to the average before activation and valence values for those previous viewers who have engaged with that secondary content with the proviso that the current user's estimated activation and valence after the secondary content not become too high or too low from the average determined from previous users.

FIG. 9D is an example of a table that represents values of the emotional arc, in accordance with some embodiments of the disclosure. The activation, valence, and emotional arc calculated based on the activation and valence numbers may be presented in a graphical format, such as in FIGS. 9A-9C, or in a table format such as in FIG. 9D.

In one embodiment, as depicted in FIG. 9D, the emotional arc value is a summation of the balance and the activation value at a particular play position in the video. As depicted, the balance value at play position one is "10" while the activation value at the same play position is "5." As such the calculated emotional arc value at play position one is "15." In another embodiment, as depicted at play position 20, the emotional arc value may be a summation of a valence value, activation value, and any values associated with any additional factors, such as a "3" in this example, that may be considered to get a complete emotional picture of the user's emotions as the user was consuming the video at play position 20. For example, the additional factors may include, the current user having previously consumed the content, such as the primary content or the Ad. Since repetition of a previously played content may not have the same impact at it did when it was played the first time, an offset for the repetition may be made. Larger offsets may also be made based on the number of times the content has been previously consumed, i.e., the larger the number of times the same content was previously consumed, the larger the offset. Yet another additional factor may be based on the user's profile which may be indicative of the user's likes and dislikes. Another additional factor may be based on the consumption history if they have liked or disliked similar content during their previous consumptions. Yet another additional factor may be the time of the day, the day of the week or month, if the user is consuming the content during dinner, with family, which browsing other content simultaneously on another device etc.

FIGS. 10 and 11 are examples of a list of emotions and their varans from mild to intense and pleasant to unpleasant, in accordance with some embodiments of the disclosure. These emotions include tense, nervous, stressed, upset, side, depressed, sluggish, bored, com, relaxed, serene, contented, happy, elated, enthusiastic, excited, alert, distressed, annoyed, alarm, amused, gloomy, bored, relaxed, satisfied, pleased, frustrated, miserable, and sad to name a few. The type of emotions described are not limited and other emotions not listed are also contemplated.

The models, such as the Russell's circumplex model, may list some of the above-described emotions on a scale of unpleasant to pleasant, activated deactivated, intense to mile, and pleasant to unpleasant. Other scales may also be used to capture the emotion and its intensity.

Figure 12:
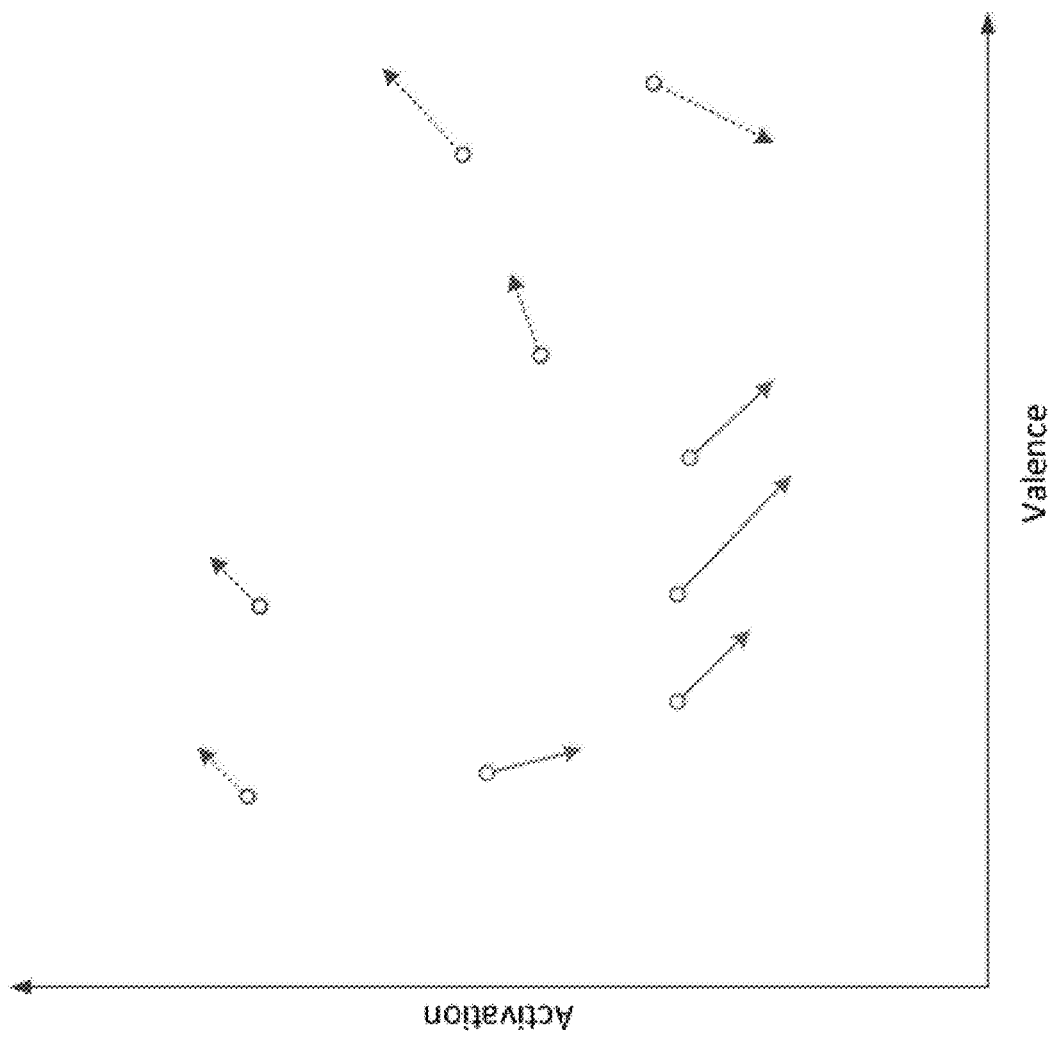
FIG. 12 is graph of positive and negative movements in a valence and activation graph, in accordance with some embodiments of the disclosure.

FIG. 12 is graph of positive and negative movements in a valence and activation graph, in accordance with some embodiments of the disclosure. In one embodiment, solid green colored arrows are used for users who have demonstrated the desired impact of the secondary content. For example, if the creator of secondary content has designed the secondary content to produce a desired impact, which is defined by the average emotional arc, then the user's current impact based on their emotional response may be measured against the desired impact and the green arrows will reflect if such an emotional response was actually attained. The dashed red colored arrows are used for other users that have not demonstrated the desired impact.

In one embodiment, the process of generating the green and red arrows includes the control circuitry calculating statistics for the users upon whom the desired impact is observed. In particular, the control circuitry captures the average starting activation and valence and the average change to the user's activation and valence. The solid green arrows indicate that the secondary content is most effective for users who exhibit valence and activation in a middle region, and who upon watching the secondary content become somewhat "calmer"—as indicated by their activation coming down while their valence becomes more positive. In other embodiments, other effects and different levels of valence and activation, such as a higher valence and activation causing the viewer to be become more energetic or any of the emotions displayed in FIGS. 10-11 may be experienced.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed:

1. A method comprising:
   determining a primary emotional arc of a primary content, wherein the primary emotional arc is based on emotional response data from a plurality of users that have previously consumed the primary content;
   estimating an emotional response from a current user based on the primary emotional arc prior to the current user consuming the primary content;
   determining that a current emotional response from the current user is within a threshold of the estimated emotional response; and
   in response to the determination that the current emotional response from the current user is within the threshold of the estimated emotional response, causing insertion, into the primary content during its display on a media device, of secondary content that is designated for a value of emotional response that is within the threshold of the estimated emotional response.

2. The method of claim 1, wherein determining that the current emotional response from the current user is within the threshold of the estimated emotional response further comprises:
   determining a value of the primary emotional arc at a first play position in the primary content;
   determining a value of the current emotional response from the current user at the first play position in the primary content; and
   comparing the value of the primary emotional arc at the first play position with the value of the emotional response from the current user at the first play position to determine whether the current emotional response from the current user is within the threshold of the estimated emotional response.

3. The method of claim 2, further comprising, causing insertion of the secondary content either at the first play position or within a predefined time of the first play position.

4. The method of claim 1, wherein determining the primary emotional arc of the primary content comprises:
   displaying the primary content to the plurality of users;
   receiving emotional response data from the plurality of users for the displayed primary content; and
   generating the primary emotional arc based on an average of the received emotional response data from the plurality of users.

5. The method of claim 4, further comprising using a camera associated with a media device used by each user, of the plurality of users, to obtain emotional response data, wherein the emotional response data using the camera associated with the media device used by each user is obtained from monitoring by the camera of a gaze of the user during a display of the primary content.

6. The method of claim 4, further comprising using devices capable of collecting biometric data that are communicatively connected with a media device used by each user, of the plurality of users, to obtain emotional response data, wherein the emotional response data collected by using the devices capable of collecting biometric data that are communicatively connected with the media device used by each user is any one of: user's heartbeat or user's movements.

7. The method of claim 1, wherein, determining that the current emotional response from the current user is within the threshold of the estimated emotional response further comprises:
   monitoring the user's current emotional response during the display of the primary content;
   generating a current emotional arc based on the user's current emotional response data collected from the current user during the display of the primary content; and
   comparing the current emotional arc to the estimated emotional response to determine if the current emotional arc is within a threshold of the estimated emotional response.

8. The method of claim 1, further comprising, determining that the current emotional response from the current user is not within the threshold of the estimated emotional response; and
   in response to the determination that the current emotional response from the current user is not within the threshold of the estimated emotional response;
   determining a current emotional value of the user at a current play position; and
   inserting a secondary content that is associated with the current emotional value into the primary content at the current play position.

9. The method of claim 1, further comprising, associating a value of the primary emotional arc of the primary content with one or more emotions.

10. The method of claim 1, further comprising:
    determining that the current emotional response from the current user is not within the threshold of the estimated emotional response; and
    in response to the determination that the current emotional response from the current user is not within the threshold of the estimated emotional response, providing an offset to the primary emotional arc of the primary content, wherein the offset is based on a number of times the current user has consumed the primary content.

11. The method of claim 1, wherein determining a primary emotional arc of the primary content further comprises:
    displaying the primary content to a first group of users that are aligned with a first type of interest and to a second group of users that are aligned with a second type of interest; and
    determining a first primary emotional arc for the first group of users and a second primary emotional arc for the second group of users based on their respective emotional response data.

12. The method of claim 11, wherein, the first type of interest differs or is opposite to the second type of interest.

13. The method of claim 11, further comprising:
    determining an interest of the current user;
    comparing the interest with the first type of interest and the second type of interest; and
    in response to determining that the current user's interest is aligned with the first type of interest, using the first primary emotional arc as the primary emotional arc for the primary content.

14. The method of claim 1, further comprising, using the primary emotional arc of the primary content as an estimating tool for comparing the estimated emotional response of the current user prior to consuming the primary content to an actual response of the current user after consuming the primary content.

15. A system comprising:
    communications circuitry for transmitting a video stream to a media device; and
    control circuitry to:
        determine a primary emotional arc of primary content, wherein the primary emotional arc is based on emotional response data from a plurality of users that have previously consumed the primary content;

estimate an emotional response from a current user based on the primary emotional arc prior to the current user consuming the primary content;

determine that a current emotional response from the current user is within a threshold of the estimated emotional response;

in response to the determination that the current emotional response from the current user is within the threshold of the estimated emotional response, causing insertion, into the primary content during its display on the media device, of secondary content that is designated for a value of emotional response that is within the threshold of the estimated emotional response; and using the communications circuitry, transmitting in the video stream, the primary content with the inserted secondary content to the media device.

16. The system of claim 15, wherein determining that the current emotional response from the current user is within the threshold of the estimated emotional response further comprises, the control circuitry configured to:

determine a value of the primary emotional arc at a first play position in the primary content;

determine a value of the current emotional response from the current user at the first play position in the primary content;

compare the value of the primary emotional arc at the first play position with the value of the emotional response from the current user at the first play position to determine whether the current emotional response from the current user is within the threshold of the estimated emotional response.

17. The system of claim 16, further comprising, the control circuitry configured to cause insertion of the secondary content either at the first play position or within a predefined time of the first play position.

18. The system of claim 15, wherein determining the primary emotional arc of the primary content comprises, the control circuitry configured to:

display the primary content to the plurality of users;

receive emotional response data from the plurality of users for the displayed primary content; and generate the primary emotional arc based on an average of the received emotional response data from the plurality of users.

19. The system of claim 15, wherein, determining that the current emotional response from the current user is within the threshold of the estimated emotional response further comprises, the control circuitry configured to:

monitor the user's current emotional response during the display of the primary content;

generate a current emotional arc based on the user's current emotional response data collected from the current user during the display of the primary content; and compare the current emotional arc to the estimated emotional response to determine if the current emotional arc is within a threshold of the estimated emotional response.

20. The system of claim 15, further comprising, the control circuitry configured to:

determine that the current emotional response from the current user is not within the threshold of the estimated emotional response; and in response to the determination that the current emotional response from the current user is not within the threshold of the estimated emotional response, provide an offset to the primary emotional arc of the primary content.

21. The system of claim 15, wherein determining a primary emotional arc of the primary content further comprises, the control circuitry configured to:

display the primary content to a first group of users that are aligned with a first type of interest and to a second group of users that are aligned with a second type of interest; and determine a first primary emotional arc for the first group of users and a second primary emotional arc for the second group of users based on their respective emotional response data.

22. The system of claim 21, further comprising, the control circuitry configured to:

determine an interest of the current user;

compare the interest with the first type of interest and the second type of interest; and in response to determining that the current user's interest is aligned with the first type of interest, use the first primary emotional arc as the primary emotional arc for the primary content.

* * * * *